United States Patent
Nakamura

(10) Patent No.: US 10,528,317 B2
(45) Date of Patent: Jan. 7, 2020

(54) COMMUNICATION SYSTEM, COMMUNICATION METHOD, AND ELECTRONIC APPARATUS

(71) Applicant: Ricoh Company, Ltd., Tokyo (JP)

(72) Inventor: Shigeru Nakamura, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/033,621

(22) Filed: Jul. 12, 2018

(65) Prior Publication Data
US 2019/0034154 A1 Jan. 31, 2019

(30) Foreign Application Priority Data
Jul. 28, 2017 (JP) .................................. 2017-147256

(51) Int. Cl.
*G06F 3/00* (2006.01)
*G06F 3/14* (2006.01)
(Continued)

(52) U.S. Cl.
CPC ........ *G06F 3/1462* (2013.01); *G06F 3/04847* (2013.01); *G06F 3/04883* (2013.01); *H04N 1/00511* (2013.01)

(58) Field of Classification Search
CPC .............. G06K 15/1805; G06F 3/1462; G06F 3/04847
(Continued)

(56) References Cited

U.S. PATENT DOCUMENTS

| 2016/0231996 A1 | 8/2016 | Tamura et al. |
| 2016/0231997 A1 | 8/2016 | Mihara et al. |

(Continued)

FOREIGN PATENT DOCUMENTS

| JP | 2006-015524 | 1/2006 |
| JP | 2006-173681 | 6/2006 |

(Continued)

OTHER PUBLICATIONS

Extended European Search Report dated Dec. 6, 2018 in European Patent Application No. 18185812.7, 7 pages.

*Primary Examiner* — Andrey Belousov
(74) *Attorney, Agent, or Firm* — Xsensus LLP

(57) ABSTRACT

A communication system includes a first electronic apparatus settable with first setting information for a plurality of items and a second electronic apparatus settable with second setting information for the plurality of items, and communicably connected to the first electronic apparatus. The first electronic apparatus includes first circuitry to transmit, to the second electronic apparatus, the first setting information including determination information set for each of the plurality of items to determine whether the first setting information is synchronized with the second setting information. The second electronic apparatus includes second circuitry to receive the first setting information, determine whether the first setting information is synchronized with the second setting information for each of the plurality of items based on the determination information, and reflect a value set for one of the plurality of items of the first setting information on the second setting information according to a determination.

18 Claims, 25 Drawing Sheets

(51) Int. Cl.
*G06F 3/0484* (2013.01)
*H04N 1/00* (2006.01)
*G06F 3/0488* (2013.01)

(58) Field of Classification Search
USPC ........................................................ 715/735
See application file for complete search history.

(56) References Cited

U.S. PATENT DOCUMENTS

2016/0358047 A1* 12/2016 Asahara ............. G06K 15/1805
2017/0041488 A1 2/2017 Shibata
2017/0139664 A1 5/2017 Park
2017/0171513 A1 6/2017 Nakamura
2017/0177151 A1 6/2017 Yoshimura et al.
2017/0344248 A1 11/2017 Oikawa et al.
2018/0095711 A1 4/2018 Kanda et al.

FOREIGN PATENT DOCUMENTS

JP 2017-068684 4/2017
WO WO 2010/090286 A1 8/2010

* cited by examiner

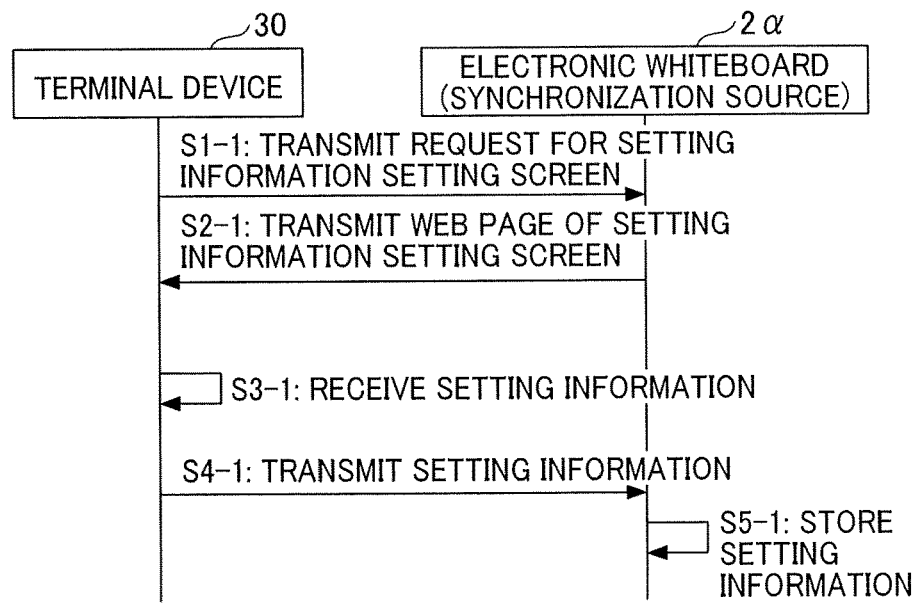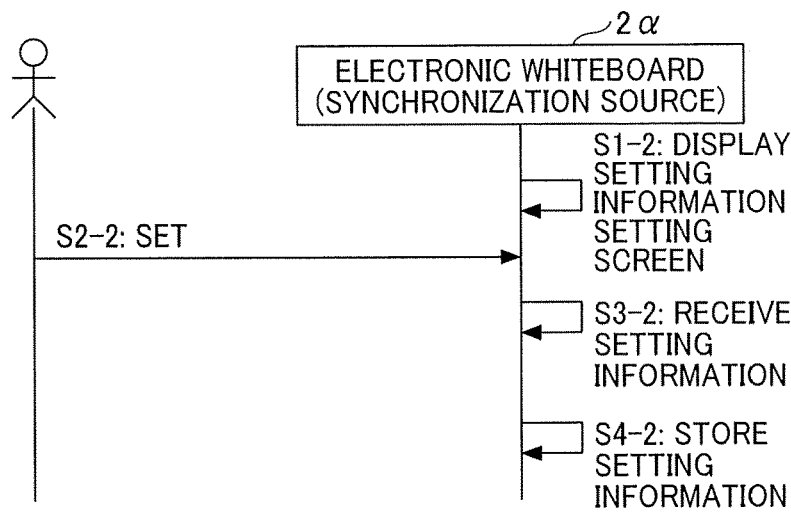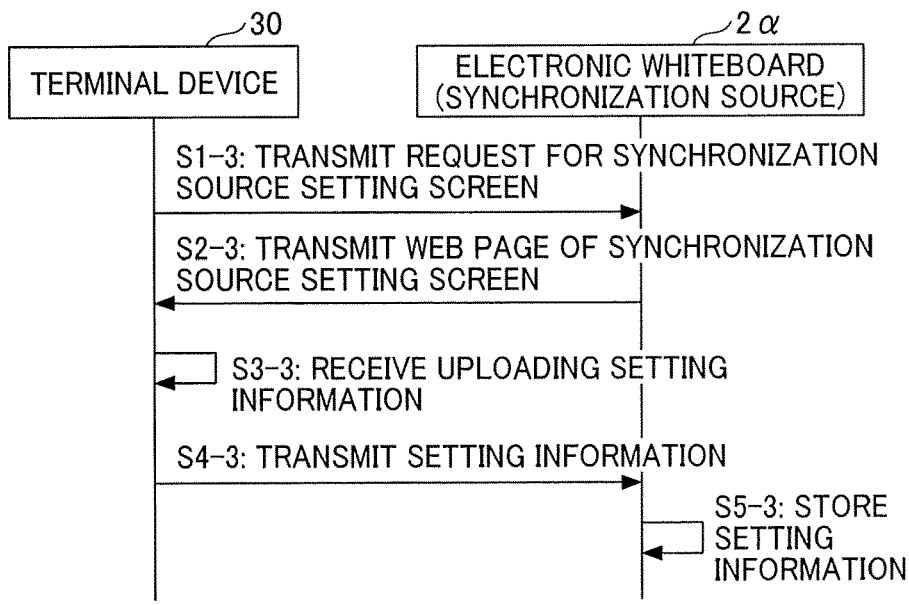

FIG. 13

(a) <PRINTER ADDRESS>192.168.10.01</PRINTER ADDRESS>

(b) <PRINTER ADDRESS group="1">192.168.10.01</PRINTER ADDRESS>

(c)
```
<printer>
  <ip>192.168.10.01</ip>
  <group>1</group>
</printer>
```

(d)
```
{
  "PRINTER ADDRESS": {
    "-group":"1",
    "#text":"192.168.10.01"
  }
}
```

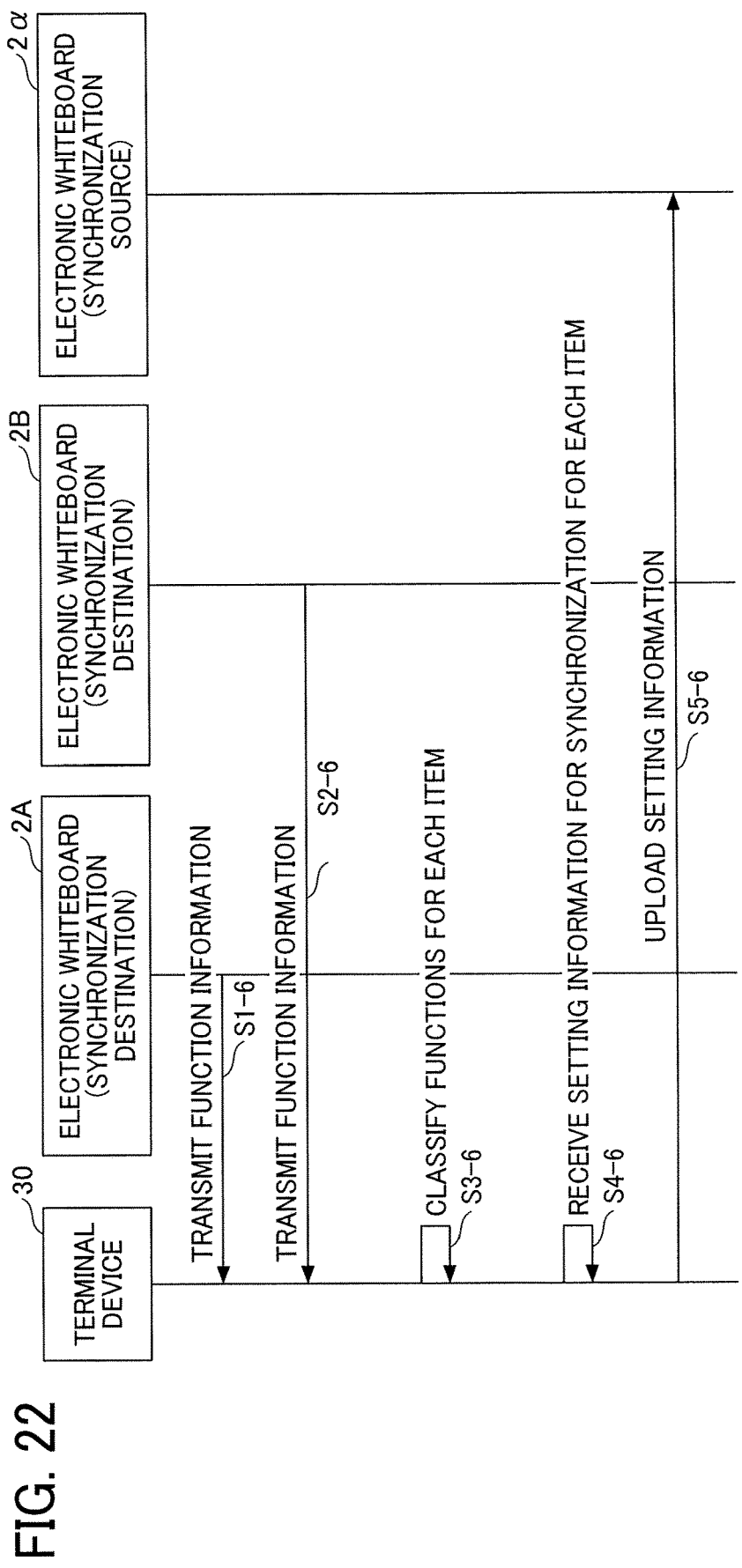

COMMUNICATION SYSTEM, COMMUNICATION METHOD, AND ELECTRONIC APPARATUS

CROSS-REFERENCE TO RELAYED APPLICATION

This patent application is based on and claims priority pursuant to 35 U.S.C. § 119(a) to Japanese Patent Application No. 2017-147256, filed on Jul. 28, 2017, in the Japan Patent Office, the entire disclosure of which is hereby incorporated by reference herein.

BACKGROUND

Technical Field

Embodiments of the present disclosure relate to a communication system, a communication method and an electronic apparatus.

Related Art

Electronic whiteboards including a touch panel provided on a large type of flat panel display are known. The electronic whiteboard displays a screen having a function as a blackboard that captures a stroke or a track of an electronic pen, a finger, or the like via the touch panel to draw manually written contents on the screen. This allows a user to use the electronic whiteboard as a blackboard.

Such an electronic whiteboard has been improved more and more. For example, the electronic whiteboard is connectable to a printer or communicable with other electronic whiteboards provided in other sites. Additionally, the number of items for the electronic whiteboard to be set by an administrator of client has been increased. In a case where pluralities of electronic whiteboards of the same type are provided in an organization, an administrator of the pluralities of electronic whiteboards are required to set up each of the pluralities of electronic whiteboards by setting information one by one. There is a demand, from customers, to collectively set the settings of the plurality of electronic whiteboards in the same manner.

To meet such a demand, there is a known technique in which a server determines whether setting information is required to be transmitted to a plurality of devices to be set, based on information acquired from each of the plurality of devices to be set and collectively transmits the setting information to one or more devices to which the setting information is required to be transmitted according to the determination.

In addition to such a demand to simply set the setting information for all the plurality of electronic whiteboards in the same manner, there is another demand to selectively set setting information for the plurality of electronic whiteboards. To meet this demand, a technique of synchronizing some of the plurality of electronic whiteboards is devised. For example, a known image processing apparatus updates setting information, when receiving setting information from another image processing apparatus belonging to the same group.

SUMMARY

An exemplary embodiment includes a communication system including a first electronic apparatus settable with first setting information for a plurality of items and a second electronic apparatus settable with second setting information for the plurality of items, and communicably connected to the first electronic apparatus to acquire the first setting information. The first electronic apparatus including first circuitry to transmit, to the second electronic apparatus, the first setting information. The first setting information includes determination information set for each of the plurality of items to determine whether the first setting information is synchronized with the second setting information for each of the plurality of item. The second electronic apparatus includes second circuitry to receive the first setting information, determine whether the first setting information is synchronized with the second setting information for each of the plurality of items based on the determination information included in the first setting information, and reflect a value set for one of the plurality of items of the first setting information on the second setting information, in response to a determination indicating that the first setting information is synchronized with the second setting information for the one of the plurality of items.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:908

FIGS. 12A to 12C each illustrate an example of a sequence diagram of a process of setting the setting information by one of a web setting and a user interface (UI) setting according to the one of the embodiments;

FIG. 13 illustrates an example of the setting information in which a group is set for each item according to the one of the embodiments;

FIG. 21 illustrates an example of association information in which each function is associated with (an) item(s) to be set according to the second embodiment;

FIG. 22 illustrates an example of a sequence diagram of a process of generating the setting information for synchronization with the terminal device according to the second embodiment;

Figure 1:
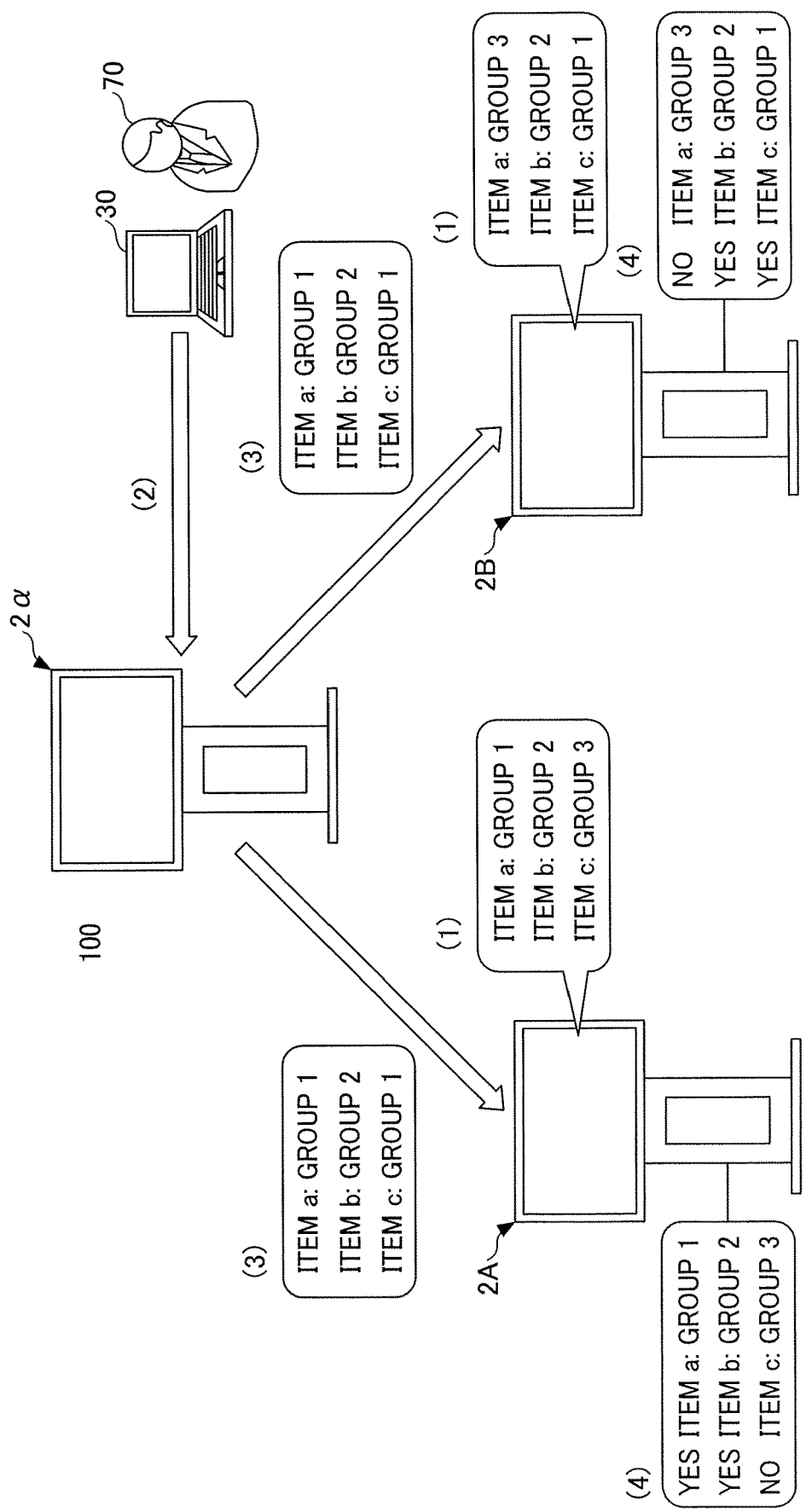
FIG. 1 illustrates a schematic diagram of an example of synchronization of setting information performed by a communication system according to one of the embodiments.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of a communication system and a communication method performed by the communication system according to one of the embodiments with reference to the drawings.

First Embodiment

<Overview of Synchronization of Setting Information>

FIG. 1 illustrates a schematic diagram of synchronization of setting information according to a first embodiment. In FIG. 1, an electronic whiteboard 2a that is a synchronization source and other two electronic whiteboards 2A and 2B that are synchronization destinations are illustrated. In this description, the electronic whiteboard is described as an example of electronic apparatuses, but not limited thereto. Hereinafter, the electronic whiteboard 2α, which is the synchronization source, may be referred to as the electronic whiteboard (synchronization source) 2α, and the electronic whiteboards 2A and 2B, which are synchronization destinations, may be referred to as the electronic whiteboards (synchronization destinations) 2A and 2B, or collectively referred to as the electronic whiteboards (synchronization destinations) 2. In this description, the electronic whiteboard 2α used as a synchronization source may be referred to as a first electronic apparatus, and the electronic whiteboard 2A or 2B used as a synchronization destination may be referred to as a second electronic apparatus.

(1) A group is set for one of a plurality of items in setting information in each of the electronic whiteboards (synchronization destinations) 2 in advance. The group is information used for grouping the items for the electronic whiteboards 2 that are to be synchronization destinations.

(2) An administrator uses a terminal device 30 to set setting information to the electronic whiteboard (synchronization source) 2α. The administrator can designate a group for each item. Accordingly, the administrator sets the setting information by considering a group for each item of the electronic whiteboard (synchronization destination) 2. For example, when the administrator desires to synchronize an item "a" for the electronic whiteboard (synchronization destination) 2A, but not for the electronic whiteboard (synchronization destination) 2B, the administrator sets a group 1 that is assigned to the item "a" in the electronic whiteboard (synchronization destination) 2A to the item "a" in the setting information.

(3) When a synchronization timing comes, the electronic whiteboard (synchronization source) 2α transmits the setting information to each electronic whiteboard (synchronization destination) 2.

(4) Each electronic whiteboard (synchronization destination) 2 checks the group for each item and synchronizes the setting information for each item. For example, a group corresponding to each of the item "a" and item "b" of the electronic whiteboard (synchronization destination) 2A is the same as that in the setting information, but a group corresponding to the item "c" is not the same as that in the setting information. (In FIG. 1, if the groups for an item are identical with each other, "YES" is marked, and the groups for an item are different from each other, "NO" is marked.) In this example, the setting information is synchronized for the item "a" and the item "b" in the electronic whiteboard (synchronization destination) 2A. Similarly, a group corresponding to the item a of the electronic whiteboard (synchronization destination) 2B is different from that in in the setting information, but a group corresponding to each of the item "b" and the item "c" of the electronic whiteboard (synchronization destination) 2B is the same as that in the setting information. In this example, the setting information is synchronized for the item "b" and the item "c" in the electronic whiteboard (synchronization destination) 2B.

As described above, the administrator can set whether the setting information is synchronized for each item. When there is an item for which synchronization is desired to be performed in the electronic whiteboard (synchronization destination) 2, the administrator sets the same group corresponding to the item of the electronic whiteboard (synchronization destination) 2 in the setting information. When there is an item for which the synchronization is not desired to be performed in the electronic whiteboard (synchronization destination) 2, the administrator sets a group that is different from the group corresponding to the item in the electronic whiteboard (synchronization destination) 2. This reduces situation for the administrator to manually set items, resulting in reduction of administrator's workload.

In the following description, any one of the plurality of electronic whiteboards including the electronic whiteboard (synchronization source) 2α and the electronic whiteboards (synchronization destinations) 2A and 2B may be individually or collectively referred to as the "electronic whiteboard(s) 2", when there is no need to distinguish for the synchronization source and the synchronization destination. One of the electronic whiteboards 2 that serves as a synchronization source is referred to as the electronic whiteboard (synchronization source) 2α. Additionally, in a case in which the electronic whiteboards 2 that are the synchronization destinations are required to be distinguish each other, an alphabet character is added to distinguish among the electronic whiteboards (synchronization destinations) 2, such as the electronic whiteboard (synchronization destination) 2A and the electronic whiteboard (synchronization destination) 2B.

Terms

A term, "setting information", is defined as settings related to the operation of the electronic whiteboard 2. For example, the settings include settings for operating appropriately, settings for connecting the Internet and/or communicating with other devices via a network, settings set according to user's preference, settings for allowing or prohibiting an operation, and settings for activating/deactivating each function.

A term, "administrator", is used in the description for convenience to represent a person who sets the setting information to the electronic whiteboard 2. A general user or a person in charge of the electronic whiteboard 2 may be a person who sets the electronic whiteboard 2.

Determination information is defined as information used by the electronic whiteboard (synchronization destination) 2 to determine whether the setting information is to be synchronized for each item. Each of the electronic whiteboard (synchronization source) 2α and the electronic whiteboard (synchronization destination) 2 has the determination information for each item. In the description of the following embodiments, terms of "group", "initial value" and "presence or absence of function" are used as examples of the determination information.

<Example Configuration of Communication System>

Figure 2:
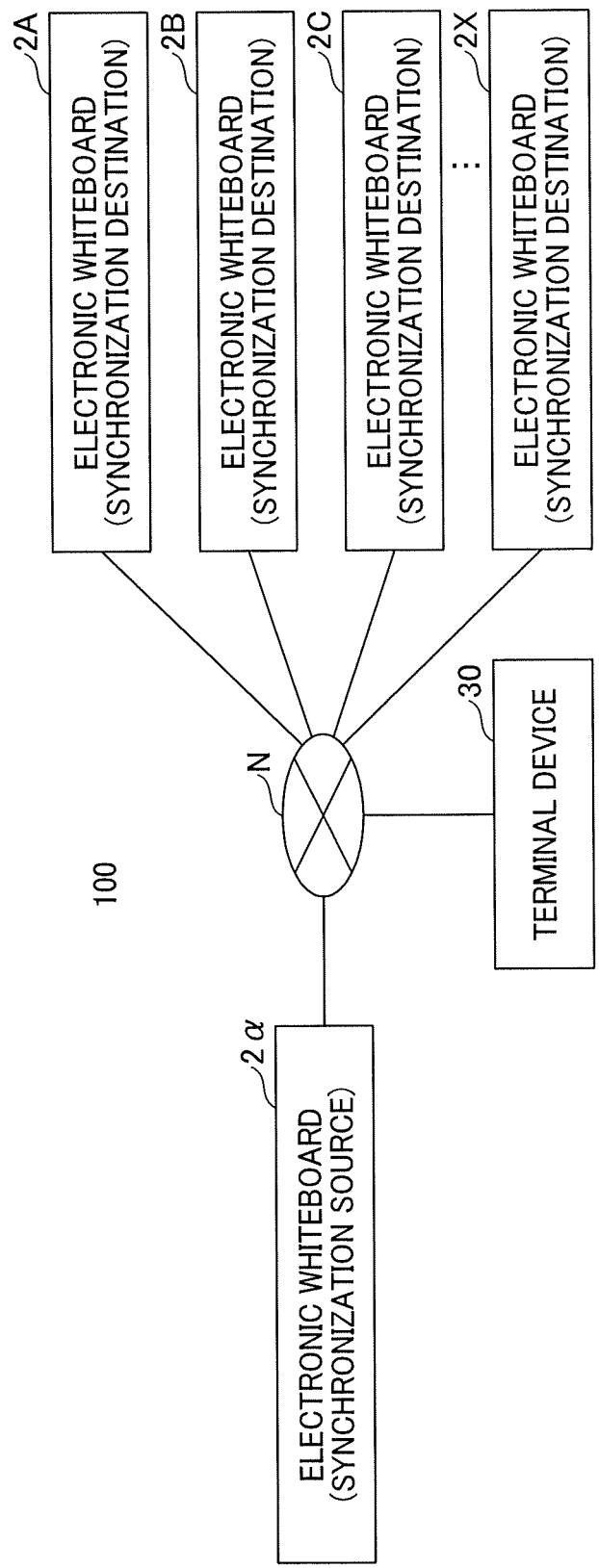
FIG. 2 illustrates a schematic diagram of the communication system according to the one of the embodiments.

FIG. 2 illustrates an example of a schematic configuration diagram of the communication system 100 according to the embodiment. The communication system 100 includes the electronic whiteboard (synchronization source) 2α, one or more electronic whiteboard (synchronization destination) 2, and the terminal device 30. The terminal device 30 serves as a device that communicates with the electronic whiteboard 2 to set or check the setting information here, so that the terminal device 30 may not be included in the communication system 100.

The communication system 100 may be referred to as an apparatus system for a reason that an electronic apparatus such as the electronic whiteboard 2 communicates. Alternatively, the communication system 100 may be referred to as an image processing system or an information processing system for processing images, for example. A name of the system (communication system 100) may be appropriately changeable according to a type of the electronic apparatus included in the communication system 100. For example, when the electronic apparatus is an electronic whiteboard, the system may be referred to as an electronic whiteboard system, and when the electronic apparatus is a multifunction peripheral (MFP), the system may be referred to as a MFP system.

A network N is, for example, a local area network (LAN) used in an office or the like. The network N may include the Ethernet (registered trademark). The network N may include the Internet. For example, one of the electronic whiteboards 2 may be connected to a virtual private network (VPN) to communicate with another one of the electronic whiteboards 2 that is provided in one of branch offices or oversea. The network N is configured as one or both of a wired network and a wireless network. Besides the network N, a dedicated wire such as a USB cable may be used for the connection. Additionally, the communication may be established using Bluetooth (registered trademark).

The electronic whiteboard 2 includes a large display with a touch panel to detect coordinates of a point pointed by the user on a board surface, and to display a stroke by connecting the coordinates of the points. Additionally, the electronic whiteboard 2 can be connected to a personal computer (PC) to display an image being displayed by the PC. The electronic whiteboard 2 also can synchronize a stroke with another electronic whiteboard 2 provided in a different site. The electronic whiteboard 2 may be referred to as an electronic information board, for example.

The electronic whiteboard 2 has a function as an information processing apparatus as clearly illustrated in a hardware block diagram, which is described later. Although the electronic whiteboard 2 is used in the description of the embodiments, the disclosure is applicable to any other type of electronic apparatuses being capable of performing synchronization of the setting information. For example, the disclosure is applicable to an image forming apparatus such as a copier, a printer, a scanner, a multifunction peripheral, Multi-Function Peripherals (MFP), a network camera including an all-weather-type camera and an omnidirectional camera, a production printing machine such as a commercial printing machine, a projector, and a videoconference terminal. The disclosure is further applicable to a game machine, a head mounted display, a car navigation system, a digital camera, and a drone, for example.

A model of the electronic whiteboard (synchronization source) $2\alpha$ may be different from that of the electronic whiteboard (synchronization destination) 2 as long as a manufacturer of the electronic whiteboard (synchronization source) $2\alpha$ and the electronic whiteboard (synchronization destination) 2 is the same, for example. For example, a target to be electronic whiteboard (synchronization destination) 2 includes an electronic whiteboard that has a product name same as the electronic whiteboard (synchronization source) $2\alpha$. Additionally, the target to be electronic whiteboard (synchronization destination) 2 includes, for example, an electronic whiteboard that has a product name same as the electronic whiteboard (synchronization source) $2\alpha$ and a release time that is different from the electronic whiteboard (synchronization source) $2\alpha$. The target to be electronic whiteboard (synchronization destination) 2 includes, for example, an electronic whiteboard that has a product name different from that of the electronic whiteboard (synchronization source) $2\alpha$. Because the plurality of electronic whiteboards that can synchronize the setting information each other has the same operating system (OS), application or firmware (a version of program is not be required to be the same) even when hardware has a different, the plurality of electronic whiteboards has the same setting items. Additionally, the setting items may not be completely the same, as long as there are one or more items in common.

The electronic whiteboards 2 that are targets to be the synchronization destination are managed by the administrator and registered by the electronic whiteboard (synchronization source) $2\alpha$, using, for example, an IP address of the electronic whiteboards (synchronization destinations) 2. Even when the electronic whiteboard (synchronization source) $2\alpha$ registers the electronic whiteboard 2 that does not have a function for synchronization, this does not cause a big problem because the electronic whiteboard 2 can ignore the registration. When the electronic whiteboard (synchronization source) $2\alpha$ wrongly registers the electronic whiteboard 2 that has the function for synchronization but is not a target to be the synchronization destination, a determination is made whether to perform synchronization for each item using the group.

The electronic whiteboard (synchronization source) $2\alpha$ is one of the electronic whiteboards 2 that is set as the synchronization source, and is not required to has a special function. Accordingly, the electronic whiteboard (synchronization destination) 2 can become the electronic whiteboard (synchronization source) $2\alpha$ depending on a setting made by the administrator. Additionally, the electronic whiteboard (synchronization source) $2\alpha$ may have a special function.

Additionally, the electronic whiteboard (synchronization source) $2\alpha$ may not have a function as an electronic whiteboard. That is, the electronic whiteboard (synchronization source) $2\alpha$ may be an information processing apparatus such as a PC that stores the setting information. The PC may be provided in a LAN, or installed as a server on the Internet or cloud.

The terminal device 30 is an information processing apparatus used for communicating with any of the electronic whiteboards 2 to be used by the administrator to set various settings or check a setting condition. The administrator operates the terminal device 30 to set the setting information in the electronic whiteboard (synchronization source) $2\alpha$. Additionally, the administrator operates the terminal device 30 to set the setting information in any of the electronic whiteboards (synchronization destinations) 2. The terminal device 30 also can display the setting information that is currently reflected on the electronic whiteboard 2.

Browser software (or a program having a function equivalent to the browser software) is operating in the terminal device 30. The electronic whiteboard 2 also has a function of a web server. Accordingly, a general-purpose information processing apparatus may be the terminal device 30. More specifically, the terminal device 30 may include a PC, a smartphone, a tablet terminal, a wearable PC, such as a sunglasses type PC or a wristwatch type PC, and a personal digital assistant (PDA). In addition, the terminal device 30 includes a game machine or a navigation device in which the browser software or a program equivalent to the browser software operates.

<Overview of Operation of Electronic Whiteboard>

Figure 3:
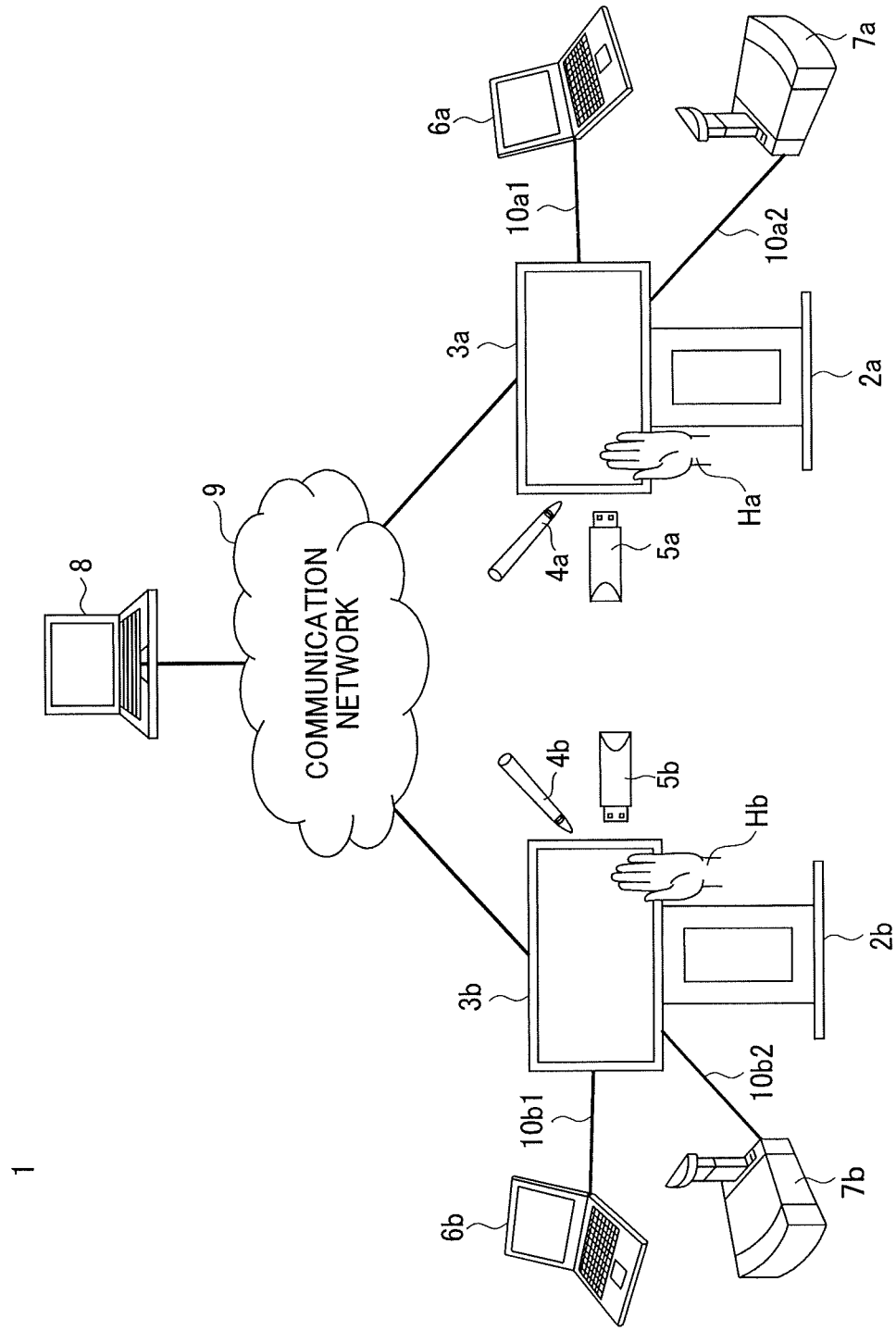
FIG. 3 illustrates a schematic diagram of an example operation of electronic whiteboards according to the one of the embodiments.

FIG. 3 illustrates a schematic diagram of an example operation of electronic whiteboards 2. In FIG. 3, only two electronic whiteboards 2a and 2b and two electronic pens 4a and 4b etc., are illustrated for purposes of simplification. However, three or more electronic whiteboards and electronic pens etc., may be used. In a general use, it is not necessary for the user to pay attention to which of the synchronization source and the synchronization destination the electronic whiteboard 2 is.

As illustrated in FIG. 3, an electronic whiteboard system 1 includes a plurality of electronic whiteboards 2a and 2b, a plurality of electronic pens 4a and 4b, Universal Serial Bus (USB) memories 5a and 5b, notebook personal computers (PCs) 6a and 6b, videoconference terminal 7a and 7b, and a PC 8. The electronic whiteboards 2a and 2b and the PC 8 are connected to be communicable with each other via a communication network 9. Further, the electronic whiteboard 2a and the electronic whiteboard 2b are provided with display 3a and the display 3b, respectively. Additionally, the electronic whiteboard 2a can display an image drawn by an event generated by the electronic pen 4a (e.g., the pen tip or the bottom of the electronic pen 4a touches the display 3a) on the display 3a. Further, the electronic whiteboard 2a may change the drawing image being displayed on the display 3a, according to an event made by the user's hand Ha. For example, in response to the user's gesture indicating size enlargement, size reduction, or turning pages, the electronic whiteboard 2a changes the image size or switches a screen.

The USB memory 5a is connectable to the electronic whiteboard $2\alpha$, and the electronic whiteboard 2a may read or write electronic files such as data in a portable document format (PDF) from or onto the USB memory 5a. The electronic whiteboards 2a is connected to the note PC 6a via a cable 10a1 to be communicable in compliance with a standard such as DisplayPort (Registered Trademark), Digital Visual Interface (DVI), High-Definition Multimedia Interface (HDMI; Registered Trademark), or Video Graphics Array (VGA). On the electronic whiteboard $2\alpha$, an event is caused by touching on the display 3a, and the event information indicating the event is transmitted to the note PC 6a in a similar manner to events input through an input device such as a mouse and a keyboard. Additionally, the videoconference terminal 7a is connected to the electronic whiteboard 2a via the cable 10a2 to be communicable using the above-described standard. The function of the videoconference terminal 7a may be incorporated in the electronic whiteboard 2. Alternatively, the note PC 6a and the videoconference terminal 7a may communicate with the electronic whiteboard 2a through a wireless connection based on various kinds of radio communication protocols such as Bluetooth (registered trademark).

At another site where the electronic whiteboard 2b is provided, in a similar manner to the above, the electronic whiteboard 2b including a display 3b, an electronic pen 4b, a USB memory 5b, a note PC 6b, a videoconference terminal 7b, a cable 10b1, and a cable 10b2 is used. According to the event caused by a user's hand Hb, for example, an image displayed on the display 3b is changeable.

Accordingly, an image that is drawn on the display 3a of the electronic whiteboard 2a at one site is also displayed on the display 3b of the electronic whiteboard 2b at the other site. By contrast, the image drawn on the display 3b of the electronic whiteboard 2b at the other site is also displayed on the display 3a of the electronic whiteboard 2a at the one site. As described above, a common image is shared and processed with remotely located sites, so that the electronic whiteboard system 1 with the electronic whiteboards 2 facilitates a videoconference.

Hereinafter, any one display among multiple displays is referred to as the display 3.

<Example of Hardware Configuration>
<Hardware Configuration of Electronic Whiteboard>

Figure 4:
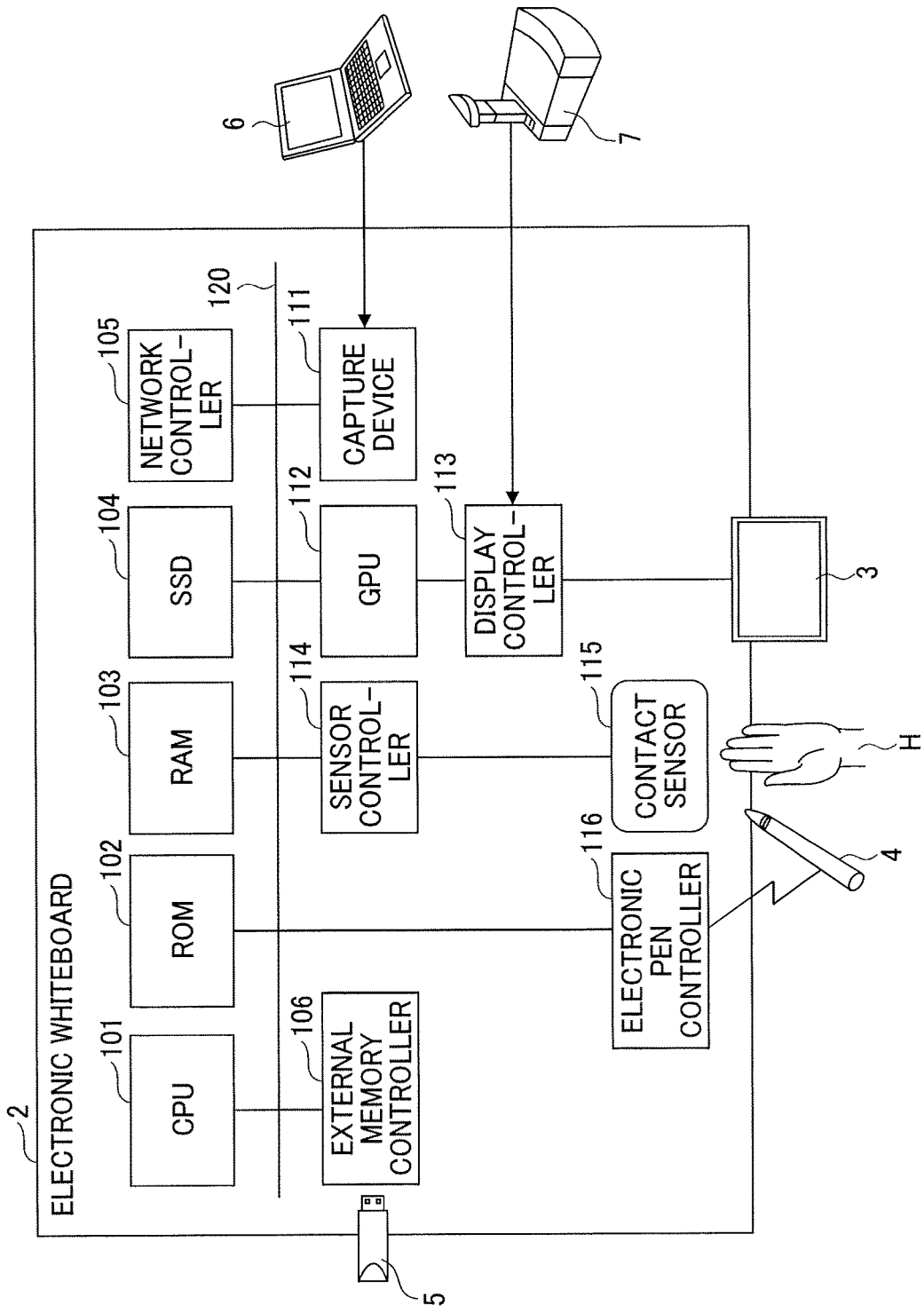
FIG. 4 illustrates an example of a hardware block diagram of the electronic whiteboard according to the one of the embodiments.

Hereinafter, a description is given of a hardware configuration of the electronic whiteboard 2 with reference to FIG. 4. FIG. 4 illustrates an example hardware block diagram of the electronic whiteboard 2.

As illustrated in FIG. 4, the electronic whiteboard 2 includes a central processing unit (CPU) 101 that controls entire operation of the electronic whiteboard 2, a read only memory (ROM) 102 that stores a program for operating the CPU 101 such as an initial program loader (IPL), a random access memory (RAM) 103 that operates as a work area for the CPU 101, a solid state drive (SSD) 104 that controls reading or writing of various types of data including control program stored in a memory, a network controller 105 that controls communication via the communication network 9, and an external memory controller 106 that controls communication with the USB memory 5.

The electronic whiteboard 2 further includes a capture device 111 that transmits image data (still or video image) for displaying on a display of the note PC 6, a graphics processing unit (GPU) 112 that processes graphics, and a display controller 113 that controls and manages a screen display to output image data from the GPU 112 to the display 3 or the videoconference terminal 7, for example.

The electronic whiteboard 2 further includes a sensor controller 114 and a contact sensor 115. The sensor controller 114 controls the contact sensor 115. The contact sensor 115 detects a touch onto the display 3 with the electronic pen 4 or the user's hand H. The contact sensor 115 inputs and detects coordinates using an infrared interception method. More specifically, the display 3 is provided with two light receiving elements disposed on both upper side ends of the display 3, and a reflector frame disposed at the sides of the display 3. The light receiving elements emit a plurality of infrared rays in parallel to a surface of the display 3. The light receiving elements receive lights passing in the direction that is the same as an optical path of the emitted infrared rays, which are reflected by the reflector frame. The contact sensor 115 outputs an identifier (ID) of the infrared ray that is blocked by an object (such as the user's hand) after being emitted from the light receiving elements, to the sensor controller 114. Based on the ID of the infrared ray, the sensor controller 114 detects a specific coordinate that is touched. Each of the IDs described below is one of examples of identification information.

The contact sensor 115 is not limited to the one with the infrared blocking method, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display.

In addition, the electronic whiteboard 2 includes an electronic pen controller 116. The electronic pen controller 116 communicates with the electronic pen 4 to detect a touch touched by the tip or bottom of the electronic pen 4 to the display 3. In addition or in alternative to detecting a touch by the tip or bottom of the electronic pen 4, the electronic pen controller 116 may also detect a touch by another part of the electronic pen 4, such as a part held by a hand of the user.

The electronic whiteboard 2 further includes a bus line 120 such as an address bus and a data bus to electrically connects the CPIJ 101, the ROM 102, the RAM 103, the SSD 104, the network controller 105, the external memory controller 106, the capture device 111, the GPU 112, the sensor controller 114, and the electronic pen controller 116 to each other, as illustrated in FIG. 3.

The program for the electronic whiteboard 2 may be stored on a computer-readable recording medium such as a compact disk read only memory (CD-ROM) for distribution.

<Hardware Configuration of Terminal Device>

Figure 5:
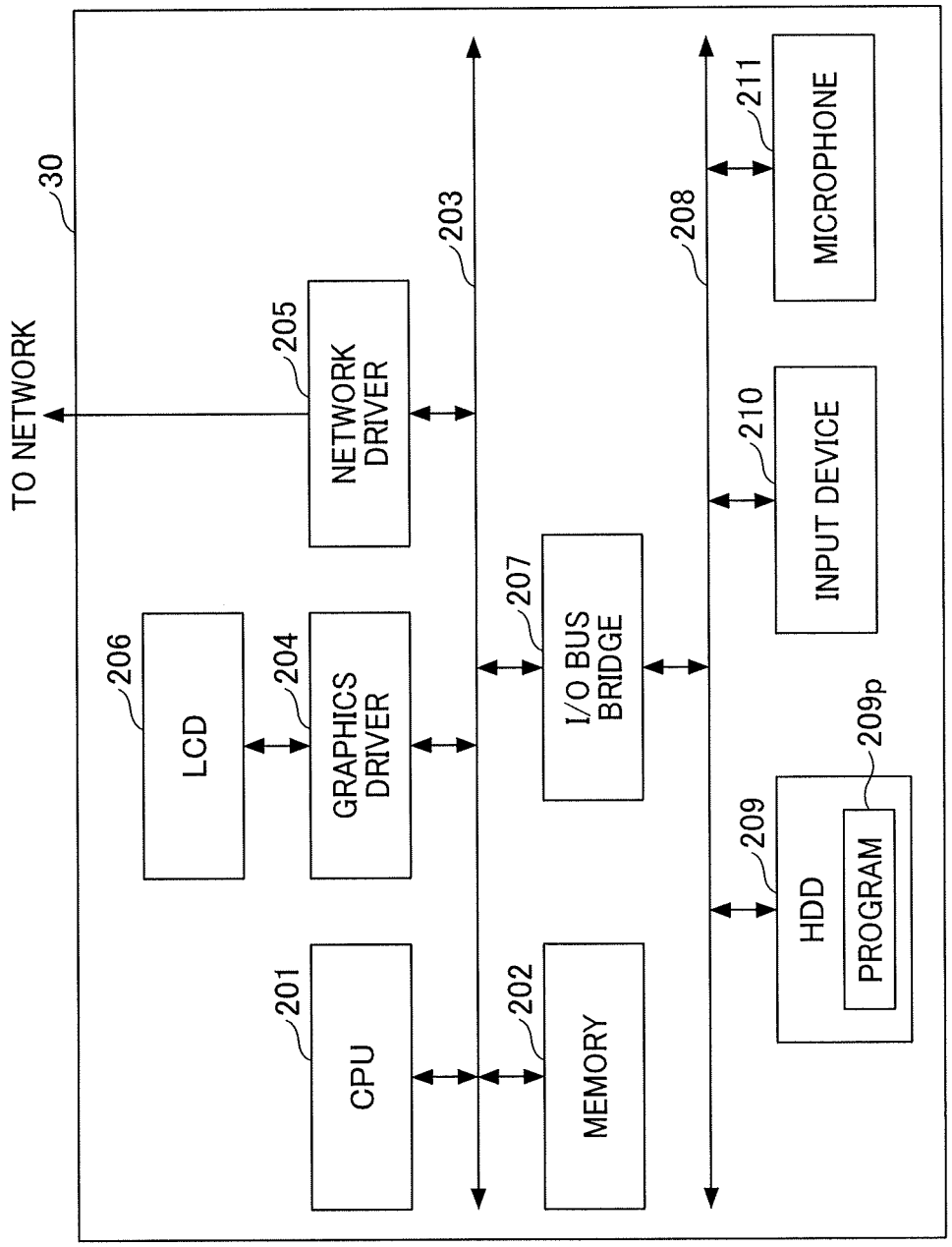
FIG. 5 illustrates an example of a schematic hardware block diagram of a terminal device according to the one of the embodiments.

FIG. 5 illustrates an example of a hardware block diagram of the terminal device 30. The terminal device 30 includes, for example, a CPU 201 and a memory 202 that enables the CPU 201 to access the data at high speed. The CPU 201 and the memory 202 are connected to other devices or drivers of the terminal device 30, such as a graphics driver 204 and a network driver (NIC) 205, through a system bus 203.

The graphics driver 204 is connected to a liquid crystal display (LCD) 206 through a bus and monitors a processing result of the CPU 201. Additionally, the network driver 205 connects the terminal device 30 to the network N at a transport layer level and a physical layer level to establish a session with the electronic whiteboard 2, for example.

Further, an input-output (I/O) bus bridge 207 is connected to the system bus 203. On the downstream side of the I/O bus bridge 207, a storage device such as a hard disc drive (HDD) 209 is connected through an I/O bus 208 such as a peripheral component interconnect (PCI), in compliance with integrated device electronics (IDE), an advanced technology attachment (ATA), an AT attachment packet interface (ATAPI), serial ATA, a small computer system interface (SCSI), a USB, etc. The HDD 209 stores a program 209p (for example, browser software) for controlling the entire terminal device 30. The HDD 209 is replaceable with a solid state drive (SSD). The program 209p may be distributed, as being stored in a recording medium. Alternatively, the program 209p may be distributed from a server for program distribution.

Further, an input device 210 such as a keyboard and a mouse (also referred to as a pointing device) is connected to the I/O bus 208 through a bus such as a USB. The input device 210 accepts inputs or instructions from an operator such as a system administrator. The hardware configuration of the terminal device 30 illustrated in FIG. 5 including the hardware elements is merely one of the examples.

<Functions>

Figure 6:
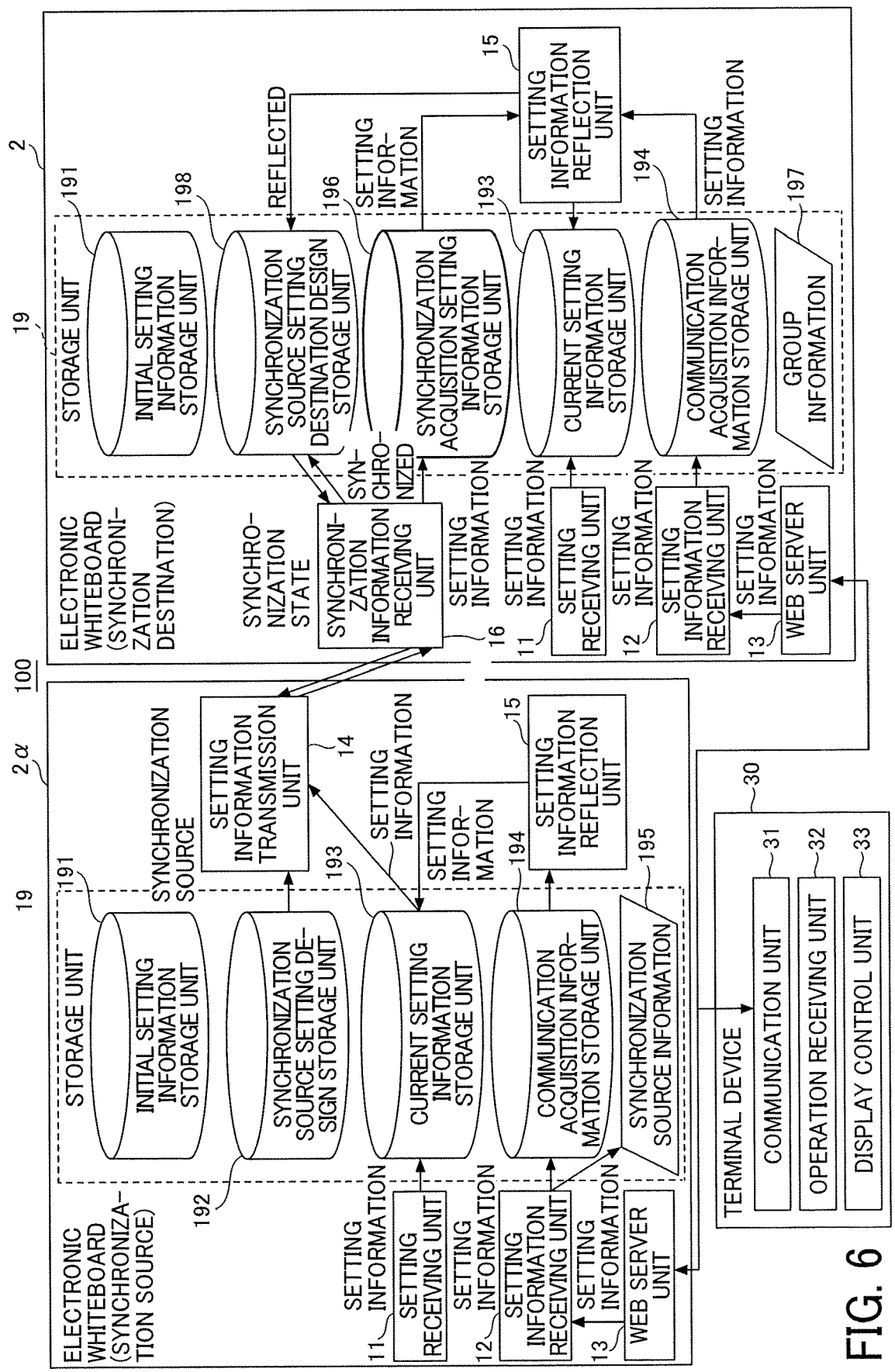
FIG. 6 illustrates an example of a functional block diagram of an electronic whiteboard that is a synchronization source, another electronic whiteboard that is a synchronization destination, and the terminal device according to the one of the embodiments.

A description is given of an example of functions of the electronic whiteboard 2α, which is the synchronization source, the electronic whiteboard 2, which is the synchronization destination, and a terminal device 30 which are included in the communication system 100 with reference to FIG. 6. FIG. 6 illustrates an example of a functional block diagram of the electronic whiteboard 2α, which is the synchronization source, the electronic whiteboard 2, which is the synchronization destination, and the terminal device 30.

<<Electronic Whiteboard (Synchronization Source) 2α>>

The electronic whiteboard (synchronization source) 2α includes, for example, a setting receiving unit 11, a setting information receiving unit 12, a web server unit 13, a setting information transmission unit 14, and a setting information reflection unit 15. Each of the above-mentioned units included in the electronic whiteboard (synchronization source) 2α is a function or a means that is implemented by operating any of the elements illustrated in FIG. 4 according to an instruction from the CPU 101 according to an electronic whiteboard control program, which is expanded from the SSD 104 to the RAM 103.

The electronic whiteboard (synchronization source) 2α includes a storage unit 19. The storage unit 19 is a storage means implemented by the SSD 104, the RAM 103 or the ROM 102, which are illustrated in FIG. 4, for storing various types of information. The storage unit 19 includes, for example, an initial setting information storage unit 191, a synchronization source setting design storage unit 192, a current setting information storage unit 193, a communication acquisition information storage unit 194, and synchronization source information 195.

Hereinafter, a description is given of information stored in the storage unit 19. The synchronization source information 195 is information indicating that the electronic whiteboard is the electronic whiteboard (synchronization source) 2α. The communication acquisition information storage unit 194 stores setting information that is set via the terminal device 30. The initial setting information storage unit 191 stores setting information that is reflected on the electronic whiteboard (synchronization source) 2α before shipment from a factory. The current setting information storage unit 193 stores setting information that is currently reflected on the electronic whiteboard (synchronization source) 2α. The reflected setting information is setting information used for controlling the electronic whiteboard (synchronization source) 2α. Accordingly, any of the information stored in the initial setting information storage unit 191, the current setting information storage unit 193, and the communication acquisition information storage unit 194 is defined as the setting information.

TABLE 1

| | |
|---|---|
| Printer Address | 192.168.10.01 |
| Mail Address Book | Mail207_05_12.txt |
| Contact List | Clist2017_06_12.txt |
| Shared Folder | File:// . . . /hoge8 |
| Template | Template1 |

Table 1 schematically illustrates an example of the setting information stored in the initial setting information storage unit 191, the current setting information storage unit 193, or the communication acquisition information storage unit 194. The setting information has many items, and Table 1 illustrates some of the items. Table 1 includes an item of printer address indicating a printer address, an item of mail address book indicating a mail address book, an item of contact list indicating a contact list, an item of shared folder indicating a shared folder, and an item of template indicating a template. The printer address is an internet protocol (IP) address used by an electronic whiteboard. The mail address book is a list of addresses of electronic mails (e-mails) that can be transmitted from the electronic whiteboard. The contact list is a list of other electronic whiteboards (for example, IP addresses) with which the electronic whiteboard communicates. The shared folder is a folder in which the electronic whiteboard of the communication system 100 commonly stores stroke data and the like. The template is image data (texture) of a background displayed on the display.

As described above, the setting information includes a lot of information that is also set on the electronic whiteboard 2. Accordingly, synchronization of the setting information can reduce the workload, which is setting the setting information for each electronic whiteboard 2, of the administrator.

A group set for each item is not illustrated in Table 1, for easy understanding, however, the group is set for each item in the setting information as illustrated in FIG. 13. However, there may be an item for which a group is not set.

TABLE 2

| | |
|---|---|
| Synchronization Destination List | 192.168.10.02 |
| | 192.168.10.03 |
| | 192.168.10.04 |
| | . . . |
| Synchronization Timing | *At 6:00 |
| | At Restarting |
| | Every 12 hours |

Table 2 schematically illustrates the information stored in the synchronization source setting design storage unit 192. The synchronization source setting design storage unit 192 has, for example, an item of synchronization destination list indicating a synchronization destination list and an item of synchronization timing indicating synchronization timings. The synchronization destination list is information used for communicating with the electronic whiteboards (synchronization destinations) 2. For example, an IP address is registered in the synchronization destination list. The synchronization timing is a timing at which the setting information is transmitted to the electronic whiteboard (synchronization destination) 2. For example, a predetermined time in a day, a restart time, and/or a periodical time (every predetermined time) is set as a timing. At the synchronization timing, the electronic whiteboard (synchronization source) 2α starts transmitting the setting information to each electronic whiteboard registered in the synchronization destination list. As described in the present embodiment, the setting information is not always transmitted. The information stored in the synchronization source setting design storage unit 192 is set in advance by the administrator, for example.

(Function of Electronic Whiteboard (Synchronization Source) 2α)

The setting information is set in the electronic whiteboard (synchronization source) 2α by one of two methods. One is a method referred to as UI setting in which the administrator inputs the setting information by operating the display 3 having a touch panel (UI: User Interface). The other is a method referred to as web setting, in which the administrator sets the setting information using the terminal device 30. Web setting further includes a way of setting in which the administrator sets information for each item and a method in which the administrator sets information and another way of setting in which text data describing the setting information for all items (e.g., extensible markup language (XML)) is collectively set.

The setting receiving unit 11 receives setting of the setting information for the electronic whiteboard (synchronization source) 2α input via the display 3. The setting receiving unit 11 stores the received setting information in the current setting information storage unit 193. That is, when the setting receiving unit 11 receives the setting information, the setting information is reflected on the electronic whiteboard 2a in real time. The setting receiving unit 11 is implemented by the CPU 101 of the electronic whiteboard (synchronization source) 2α executing a program to control the electronic pen controller 116 and the contact sensor 115.

The web server unit 13 generates a web page described in Hypertext Markup Language (HTML), JavaScript (registered trademark), Cascading Style Sheets (CSS), and the like, and transmits the web page to the terminal device 30. The web server unit 13 may be referred to as a web application, because generating a web page dynamically. In the embodiment, a web page used for setting the setting information is transmitted to the terminal device 30, and the setting information is acquired from the terminal device 30. The web server unit 13 is implemented by the CPU 101 of the electronic whiteboard (synchronization source) 2α executing a program and controlling the network controller 105.

The setting information receiving unit 12 acquires the setting information acquired from the terminal device 30 via the web server unit 13 and stores the setting information in the communication acquisition information storage unit 194. The setting information is reflected on the electronic whiteboard (synchronization source) 2α when the electronic whiteboard (synchronization source) 2α shuts down and starts up. The setting information receiving unit 12 is implemented by the CPU 101 of the electronic whiteboard (synchronization source) 2α executing a program.

When the electronic whiteboard (synchronization source) 2α shuts down and starts up, the setting information reflection unit 15 causes the current setting information storage unit 193 to store the setting information stored in the communication acquisition information storage unit 194. The electronic whiteboard 2 operates based on the setting information stored in the current setting information storage unit 193. That is, storing the setting information, which is stored in the communication acquisition information storage unit 194, in the current setting information storage unit 193 means that the setting information is reflected on the electronic whiteboard 2. Accordingly, when the electronic whiteboard (synchronization source) 2α shuts down and starts up after the terminal device 30 transmits the setting information, the setting information is reflected to the operation of the electronic whiteboard (synchronization source) 2α. The setting information reflection unit 15 is implemented by the CPU 101 of the electronic whiteboard (synchronization source) 2α executing a program.

The setting information transmission unit 14 starts transmitting the setting information to each electronic whiteboard (synchronization destination) 2 at the synchronization timing set in the synchronization source setting design storage unit 192. The setting information transmission unit 14 simply transmits the setting information at the synchronization timing, so that the setting information transmission unit 14 is not required to record a result of an inquiry or presence or absence of transmission. Additionally, the setting information transmission unit 14 determines whether to transmit the setting information based on a synchronization state acquired from the electronic whiteboard (synchronization destination) 2 and identification information identifying the setting information. The setting information transmission unit 14 transmits the setting information when any one of the following conditions is satisfied.

1. The electronic whiteboard (synchronization source) 2α receives a synchronization state of "unsynchronized" from the electronic whiteboard (synchronization destination) 2.

2. The electronic whiteboard (synchronization source) 2α receives a synchronization state of "synchronized" or "reflected", and identification information of the setting information to be transmitted from the electronic whiteboard (synchronization source) 2α and identification information of the setting information received from the electronic whiteboard (synchronization destination) 2 does not match.

The setting information transmission unit 14 is implemented by the CPU 101 of the electronic whiteboard (synchronization source) 2α executing a program and controlling the network controller 105.

<<Electronic Whiteboard (Synchronization Destination) 2>>

In the following description of a function of the electronic whiteboard (synchronization destination) 2, differences from the electronic whiteboard (synchronization source) 2α are described. The electronic whiteboard (synchronization destination) 2 includes, for example, the setting receiving unit 11, the setting information receiving unit 12, the web server unit 13, the setting information reflection unit 15, and a synchronization information receiving unit 16. Accordingly, the electronic whiteboard (synchronization destination) 2 is different from the electronic whiteboard (synchronization source) 2α in including the synchronization information receiving unit 16. Further, the setting information reflection unit 15 has a function required to be a synchronization destination.

Further, the electronic whiteboard (synchronization destination) 2 has group information 197 in the storage unit 19, and the storage unit 19 includes the initial setting information storage unit 191, the current setting information storage unit 193, the communication acquisition information storage unit 194, a synchronization destination setting design storage unit 198, and a synchronization acquisition setting information storage unit 196. Accordingly, the electronic whiteboard (synchronization destination) 2 that includes the group information 197, synchronization destination setting design storage unit 198, and the synchronization acquisition setting information storage unit 196 is different from the electronic whiteboard (synchronization source) 2α.

Hereinafter, a description is given of the synchronization acquisition setting information storage unit 196. The electronic whiteboard (synchronization destination) 2 acquires the setting information by one of three methods. Two of the three methods are the UI setting and the web setting, which are the same as that of the electronic whiteboard (synchronization source) 2α. The third method is a method referred to as synchronization setting in which the electronic whiteboard (synchronization destination) 2 receives the setting information from the electronic whiteboard (synchronization source) 2α. Accordingly, the synchronization acquisition setting information storage unit 196 stores the setting information transmitted from the electronic whiteboard (synchronization source) 2α.

TABLE 3

| | |
|---|---|
| Synchronization State | Unsynchronized or Synchronized (0001) or Reflected (0001) |
| Restarting Timing | *At 6:00<br>At Restarting<br>Every 12 hours |

Table 3 schematically illustrates the information stored in the synchronization destination setting design storage unit 198. A synchronization state and a restart timing are set in the synchronization destination setting design storage unit 198. The synchronization state indicates a state of the setting information transmitted from the electronic whiteboard (synchronization source) 2α. The synchronization state indicates one of the three states: "unsynchronized", "synchronized", or "reflected". Identification information identifying the setting information is given for each state of "synchronized" and "reflected" (0001 in Table 3).

"Unsynchronized" is a state in which the setting information is not received.

"Synchronized" is a state in which the setting information is received (state required to be reflected).

"Reflected" is a state in which the setting information has been already reflected (reflection is not required). The electronic whiteboard (synchronization destination) 2 receives the setting information in a case where the synchronization state indicates "unsynchronized" or a case where the synchronization state indicates one of "synchronized" and "reflected" and identification information of the setting information to be transmitted from the electronic whiteboard (synchronization source) 2α does not match identification information identifying the setting information set to the one of "synchronized" and "reflected".

The restart timing is a timing at which the electronic whiteboard (synchronization destination) 2 is shuts down and restarts up. Restart is defined as starting up immediately after shutting down. The electronic whiteboard 2 reflects the setting information by shutting down and starting up, namely, reflects the setting information at the restarting timing. The information stored in the synchronization destination setting design storage unit 198 is set in advance by the administrator using the terminal device 30 or via the display 3.

TABLE 4

| Item ID | Group |
|---|---|
| Item "a" | Group 1 |
| Item "b" | Group 2 |
| Item "c" | Group 3 |
| Item "d" | Group 1 |
| Item "e" | Group 3 |
| ... | ... |

Table 4 schematically illustrates the group information 197. The group information 197 is information associating item identification information (ID) of the setting information with a group. By using the group information, the electronic whiteboard (synchronization destination) 2 determines whether the setting information is synchronized for each item. Although, various methods for determining a group can be considered, the group may be determined based on, for example, at least one of information depending on the electronic whiteboard 2 and usage condition. The information depending on the electronic whiteboard 2 includes, for example, information on model, model number, series name, release time, type or version of OS, version of application or firmware, and/or the like. In addition, the usage condition includes, for example, a place where the electronic whiteboard 2 is arranged and usage frequency of the electronic whiteboard 2. The administrator determines the group for each item for the electronic whiteboard 2 taking the above into consideration. A method that does not determine the group is described in a second embodiment and a third embodiment.

Although, the group information is explicitly described in Table 4, the group for each item is set in the setting information, as described in FIG. 13, in the embodiment. Accordingly, the group information 197 is not required to be independently stored, as described in Table 4.

(Function of Electronic Whiteboard (Synchronization Destination) 2)

The synchronization information receiving unit 16 transmits the synchronization state and the identification information of the setting information to the electronic whiteboard (synchronization source) 2α. When the setting information transmission unit 14 determines to transmit, the synchronization information receiving unit 16 receives the setting information from the electronic whiteboard (synchronization source) 2α. The synchronization information receiving unit 16 is implemented by the CPU 101 of the electronic whiteboard 2 executing a program and controlling the network controller 105.

The setting information reflection unit 15 of the electronic whiteboard (synchronization destination) 2 determines whether the groups match each other for each item and reflects the setting information for the item for which the groups matches each other.

<<Terminal Device>>

The terminal device 30 includes, for example, a communication unit 31, an operation receiving unit 32, and a display control unit 33. Each of the above-mentioned functional units of the terminal device 30 is a function or a means that is implemented by operating any of the elements illustrated in FIG. 5 according to an instruction from the CPU 201 according to a program, which is expanded from the HDD 209 to the memory 202.

The communication unit 31 transmits and receives various information to and from the electronic whiteboard (synchronization source) 2α or the electronic whiteboard (synchronization destination) 2. In the embodiment, communication unit 31 receives the web page and transmits the setting information. The communication unit 31 is implemented by the CPU 201 of the terminal device 30 executing the program 209p and controlling the network driver 205.

The operation receiving unit 32 receives various operations performed by the administrator using the terminal device 30. The operation receiving unit 32 is implemented by the CPU 201 of the terminal device 30 executing the program 209p to control the input device 210, for example.

The display control unit 33 analyzes the web page transmitted from the electronic whiteboard 2 and generates a screen to be displayed by the LCD 206. Further, the display control unit 33 updates the screen according to a user input received by the operation receiving unit 32. The display control unit 33 is implemented by the CPU 201 of the terminal device 30 executing the program 209p to control the graphics driver 204, for example.

<Example of Setting Synchronization Source>

In the embodiment, any one of the electronic whiteboards 2 becomes the electronic whiteboard 2a that is the synchronization source by setting as a synchronization source. The other electronic whiteboards 2 that are not set as the synchronization source are registered in the synchronization destination list as the synchronization destinations.

Figure 7:
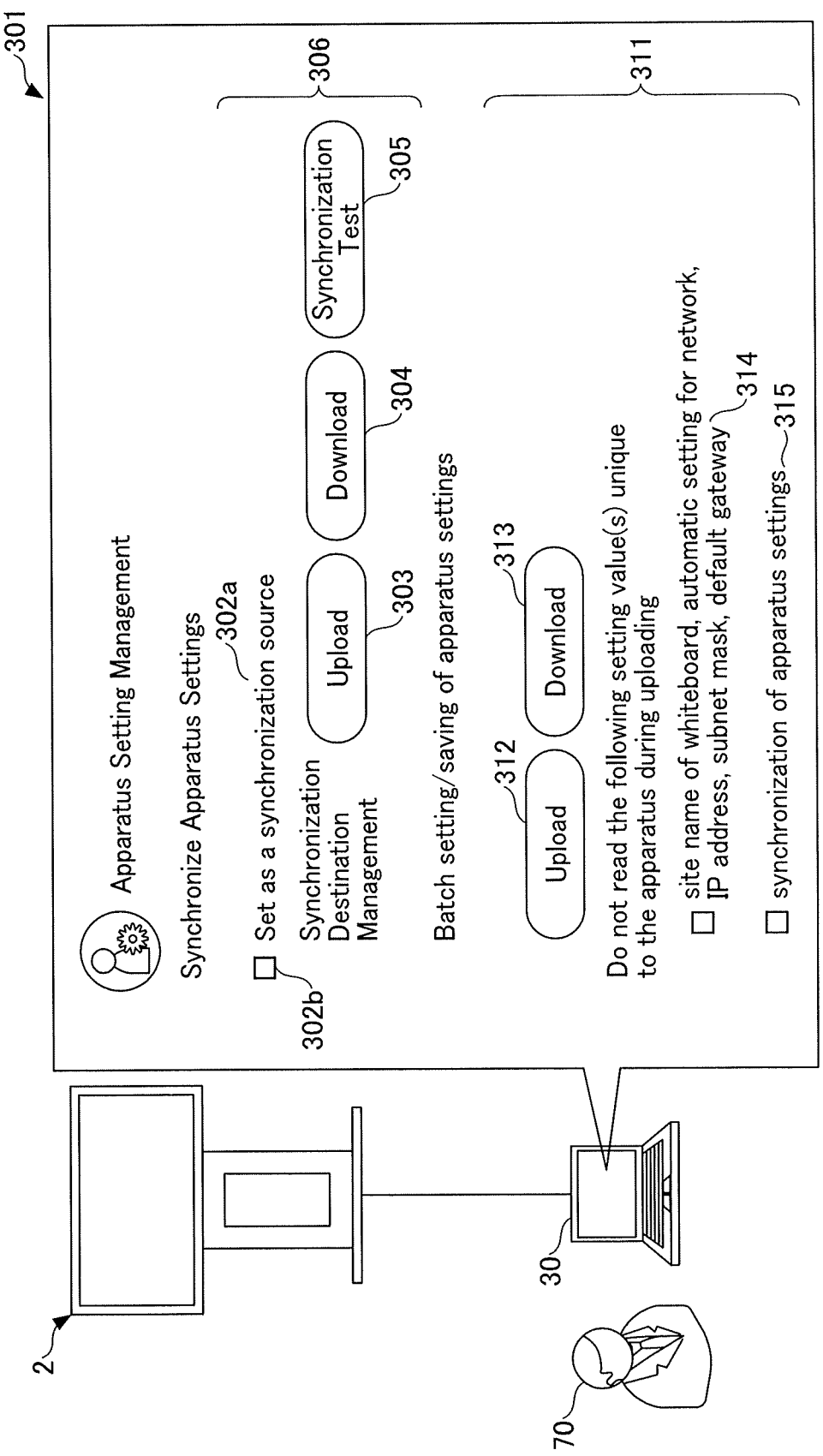
FIG. 7 illustrates an example of a synchronization source setting screen displayed on a liquid crystal display (LCD) by browser software of the terminal device according to the one of the embodiments.

FIG. 7 illustrates an example of a synchronization source setting screen 301 displayed on the LCD 206 by the browser software of the terminal device 30. The administrator designates one of the electronic whiteboards 2 to be set as the synchronization source via the terminal device 30 and causes the terminal device 30 to display the synchronization source setting screen 301 by acquiring the web page.

The synchronization source setting screen 301 has a synchronization source setting area 306. The synchronization source setting area 306 has a message 302a, "Set as a synchronization source" and a check box 302b. When the administrator clicks (presses) the check box 302b, the operation receiving unit 32 receives the operation, and the display control unit 33 displays a check mark in the check box 302b. When the above setting is transmitted to the one of the electronic whiteboards 2, which is a communication destination of the terminal device 30, the one of the electronic whiteboards 2, namely, the electronic whiteboard (synchronization source) 2α, is set as the synchronization source.

The synchronization source setting area 306 also has an upload button 303, a download button 304, and a synchronization test button 305. The upload button 303 is a button for transmitting the synchronization destination list as illustrated in Table 2 from the terminal device 30 to the electronic whiteboard 2. The download button 304 is a button for receiving the synchronization destination list as illustrated in Table 2 from the electronic whiteboard 2 to the terminal device 30. The synchronization test button 305 is a button for testing whether the electronic whiteboard (synchronization destination) 2 registered in the synchronization destination list can be synchronized with the electronic whiteboard (synchronization source) 2α. When the synchronization test button 305 is clicked, the electronic whiteboard (synchronization source) 2α receives the setting information from the electronic whiteboard (synchronization destination) 2. With the above-described operation, not only a communication test at an IP layer, but also a communication test at an application layer is performed.

Further, there is a batch setting area 311 for the setting information in a bottom side of the synchronization source setting screen 301. The batch setting area 311 for the setting information has an upload button 312 and a download button 313. The download button 313 is a button with which the terminal device 30 receives the setting information from the any one of the electronic whiteboards 2, and the upload button 312 is a button for uploading the setting information to the electronic whiteboard 2. As described above, the terminal device 30 downloads and uploads all of the setting information collectively.

It is noted that there is description indicating that "site name of whiteboard, automatic setting for network, IP address, subnet mask, default gateway" 314 is not to be uploaded. This is because the presence of two or more electronic whiteboard having the same settings each other may cause interference with communication and the like. In addition, there is a description indicating that information whether settings are for the synchronization source ("synchronization of apparatus settings" 315) is not to be uploaded. This is because if the settings for the synchronization source are synchronized, all the electronic whiteboards are set as the electronic whiteboard (synchronization source) 2α.

Figure 8:
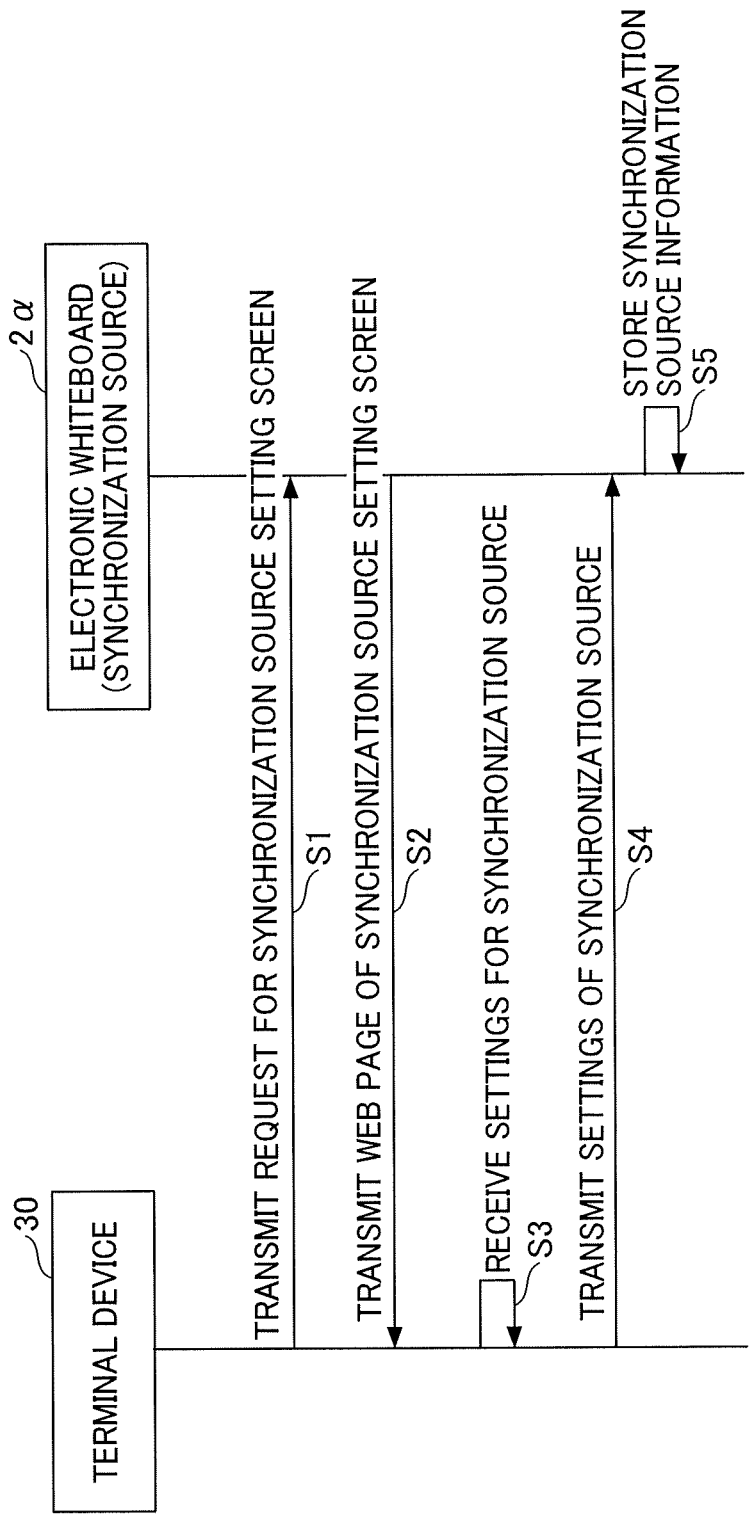
FIG. 8 illustrates an example of a sequence diagram of a process in which the terminal device sets one of the electronic whiteboards as a synchronization source according to the one of the embodiments.

FIG. 8 illustrates an example of a sequence diagram of a process in which the terminal device 30 sets the electronic whiteboard (synchronization source) 2α.

S1: When the administrator operates the terminal device 30, the communication unit 31 transmits an acquisition request for the synchronization source setting screen 301 to the electronic whiteboard (synchronization source) 2α. The electronic whiteboard (synchronization source) 2α is selected among the electronic whiteboards 2 by the administrator for the synchronization source, and the IP address and the like thereof are known in advance.

S2: The web server unit 13 of the electronic whiteboard (synchronization source) 2α transmits the web page of the synchronization source setting screen 301 in response to the acquisition request for the synchronization source setting screen 301.

S3: The display control unit 33 of the terminal device 30 displays the synchronization source setting screen 301. When the administrator clicks (presses) the check box 302b for the message 302a, which is "Set as the synchronization source", the operation receiving unit 32 receives the operation.

S4: The communication unit 31 of the terminal device 30 transmits to the electronic whiteboard (synchronization source) 2α information indicating that the electronic whiteboard (synchronization source) 2α is set as the synchronization source. Alternatively, the information may be transmitted by any other operation for transmitting, which is an operation indicating transmitting clearer than simply clicking (pressing) the check box 302b.

S5: The web server unit 13 of the electronic whiteboard (synchronization source) 2α receives the information indicating that the electronic whiteboard (synchronization source) 2α is set as the synchronization source, and the setting information receiving unit 12 causes the storage unit 19 to store the information as the synchronization source information 195.

<Setting Setting Information>

Hereinafter, a description is given of setting the setting information on the electronic whiteboard 2 with reference to FIGS. 9 to 11. One of the electronic whiteboards 2 to be set, here, can be either the synchronization source or the synchronization destination.

Figure 9:
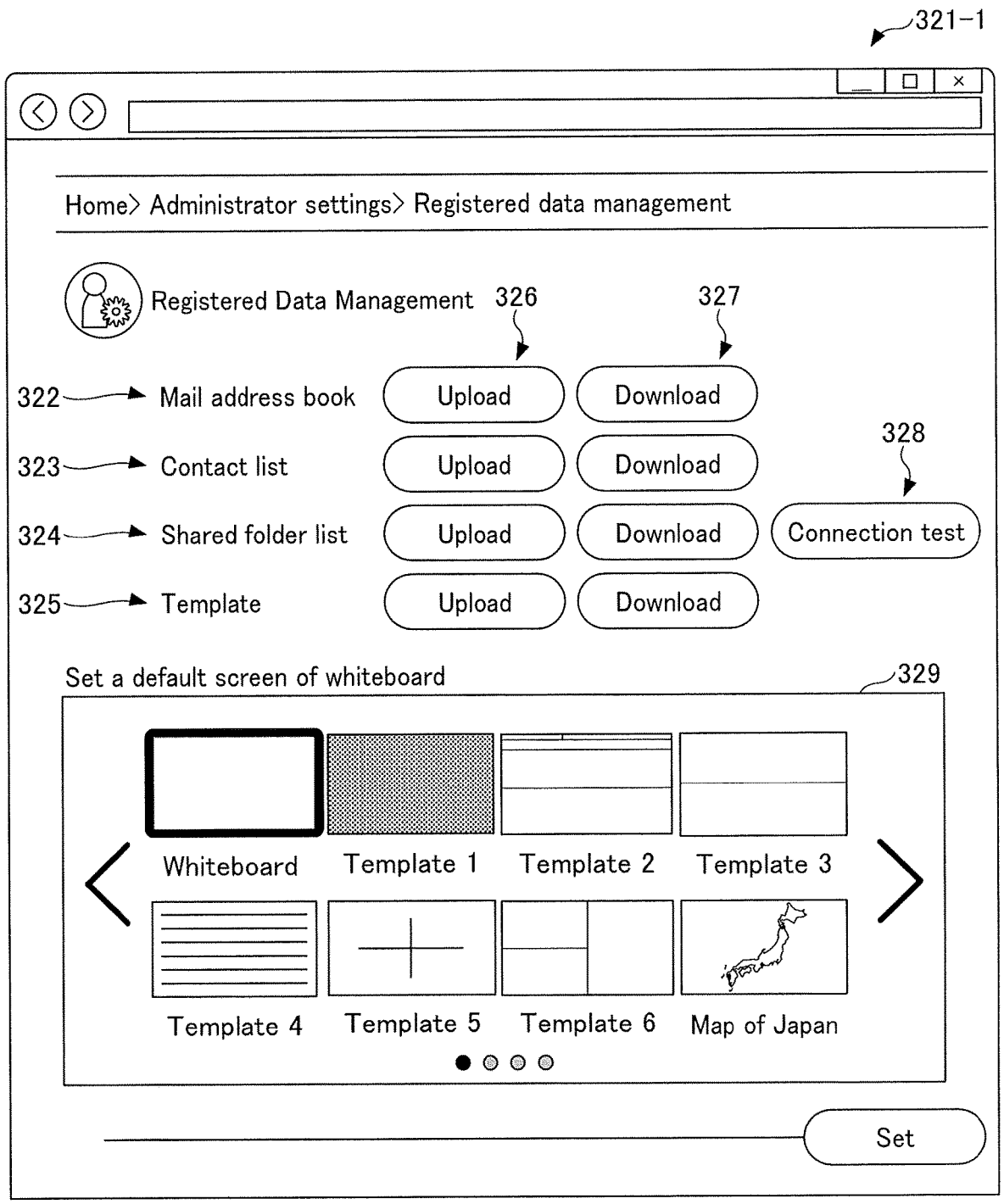
FIG. 9 illustrates an example of a setting information setting screen displayed on the LCD by the browser software of the terminal device according to the one of the embodiments.

FIG. 9 illustrates an example of a setting information setting screen 321-1 (web setting) displayed on the LCD 206 by the browser software of the terminal device 30. The administrator designates one of the electronic whiteboards 2 for setting the setting information via the terminal device 30, and causes the terminal device 30 to display the setting information setting screen 321-1 by acquiring the web page.

The setting information setting screen 321-1 has a mail address book setting field 322, a contact list setting field 323, a shared folder list setting field 324, and a template setting field 325. The mail address book setting field 322 has an upload button 326, and the administrator can set a mail address book by uploading a prepared mail address book. Additionally, a download button 327 is a button for acquiring the mail address book currently set on the electronic whiteboard 2. The same applies to the contact list setting field 323 and the template setting field 325. With respect to the template setting field 325, an image 329 including example templates is displayed, and the administrator selects one of the templates to displayed by the electronic whiteboard 2.

The shared folder list setting field 324 further includes a connection test button 328. The connection test button 328 is a button for testing whether the electronic whiteboard 2 can access a shared folder.

Figure 10:
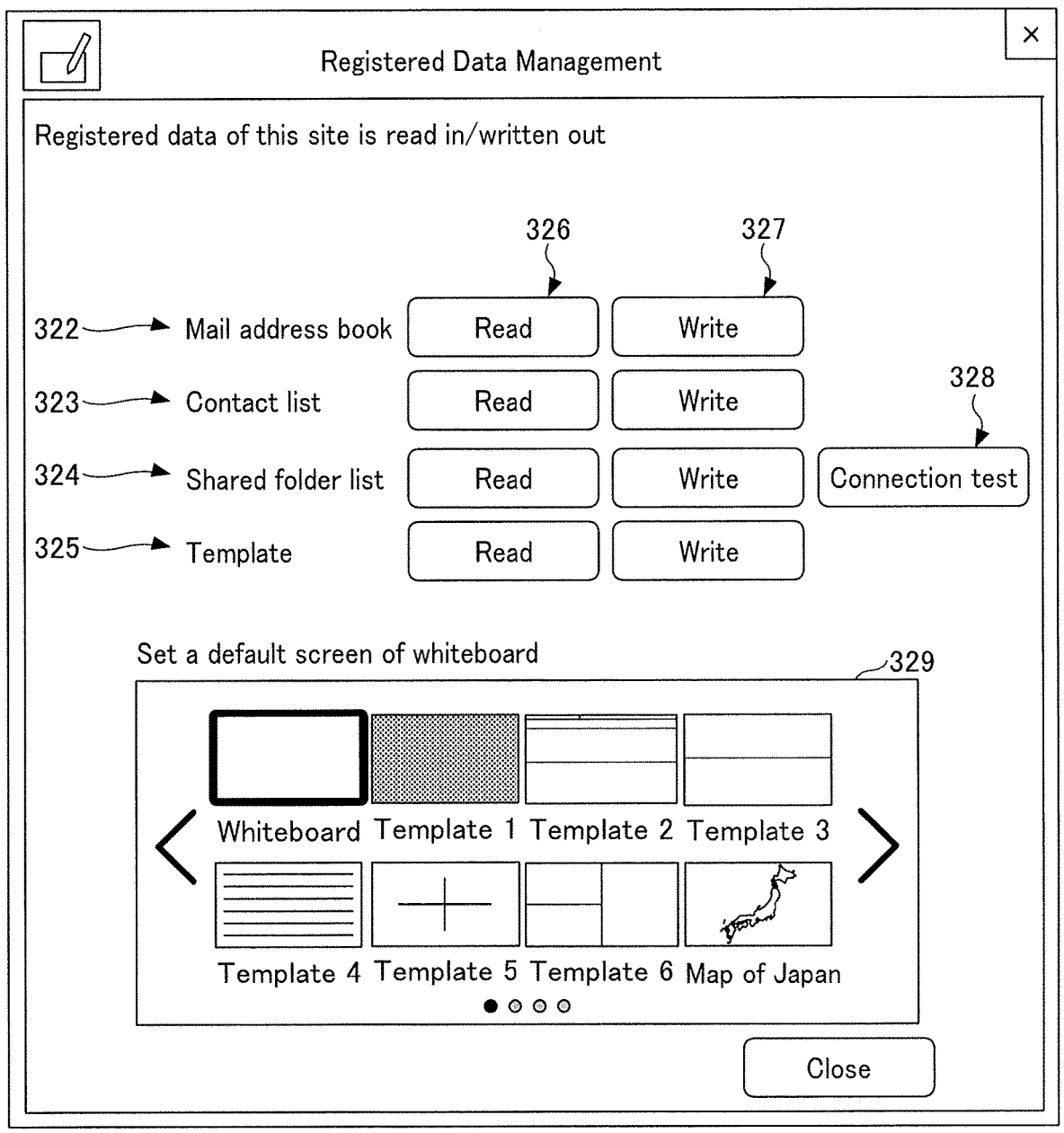
FIG. 10 illustrates an example of a setting information setting screen used by an administrator to set settings via a display of the electronic whiteboard according to the one of the embodiments.

FIG. 10 illustrates an example of a setting information setting screen 321-2 (UI setting) used by the administrator to set the same settings via the display 3 of the electronic whiteboard 2. Information to be set is the same as in FIG. 9, and the setting information setting screen 321-2 includes items substantially the same as that of the setting information setting screen 321-1. Accordingly, the administrator can set the setting information on any one of the electronic whiteboards 2 without the terminal device 30.

Figure 11:
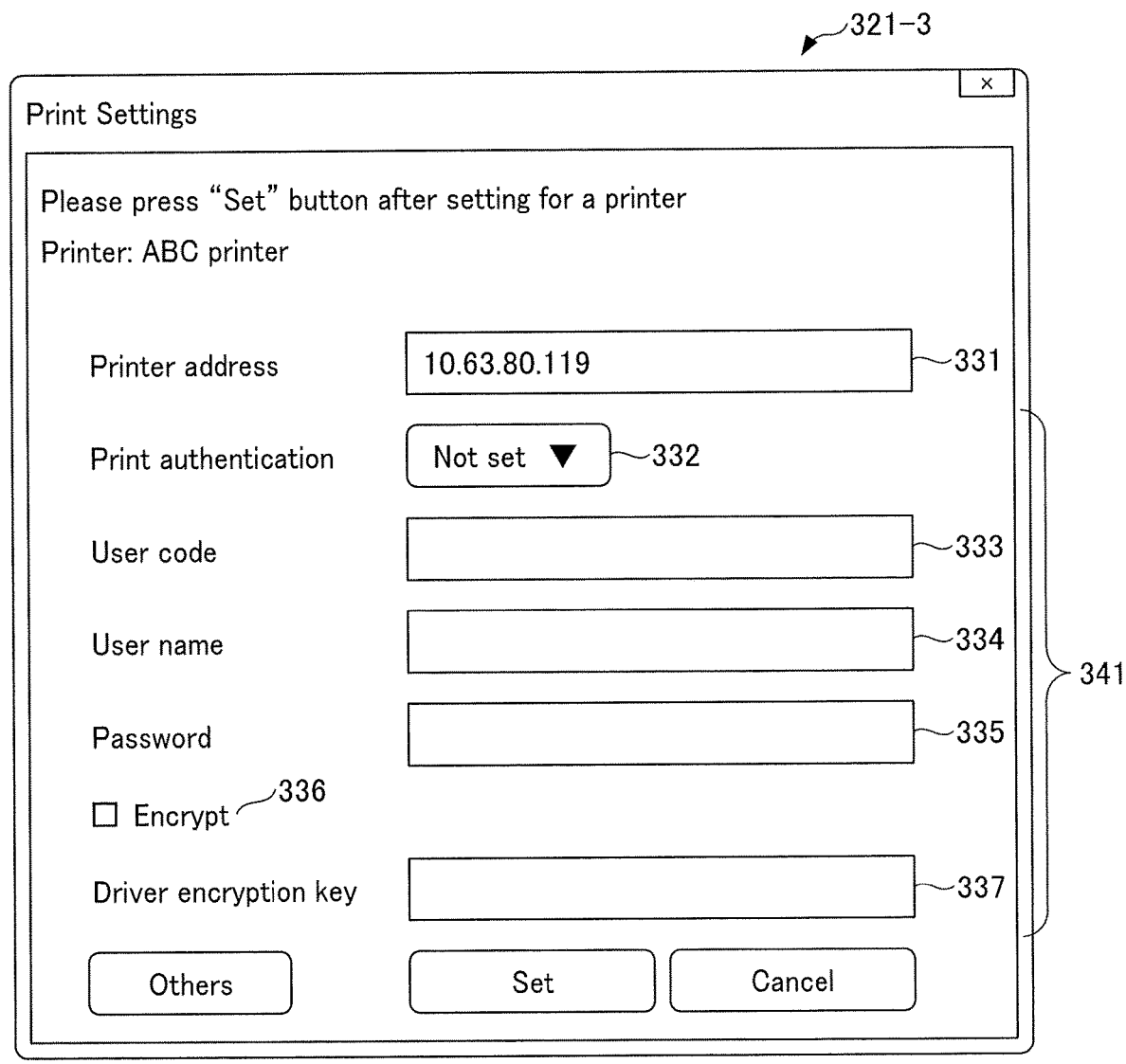
FIG. 11 illustrates an example of a setting information setting screen used by the administrator to set a printer address via the display of the electronic whiteboard according to the one of the embodiments.

FIG. 11 illustrates an example of a setting information setting screen 321-3 (UI setting) used by the administrator to set a printer address via the display of the electronic whiteboard 2. The setting information setting screen 321-3 has a printer address field 331 and an authentication setting area 341. In the printer address field 331, an IP address of the printer used by the electronic whiteboard 2 is set.

In the authentication setting area 341, a setting button 332 for set whether authentication is required when the user uses the printer is displayed, and when the authentication is set as being required, authentication information is to be set. To set (input) the authentication information, there are a user code field 333 for setting a user identification information (ID), a user name field 334 for setting a user name, and a password field 335 for setting a password. In addition, there are a check box 336 for encrypting data to be printed and input field 337 for an encryption key.

The terminal device 30 also can set the same setting information by the web setting as being set in the screen illustrated in FIG. 11. The setting information set with the screen illustrated in each of FIGS. 9 to 11 is a merely example, and other setting information may be set using the terminal device 30 or the electronic whiteboard 2.

FIG. 12A illustrates an example of a sequence diagram of a process of setting the setting information for each item by the web setting.

S1-1: When the administrator operates the terminal device 30, the communication unit 31 transmits an acquisition request for the setting information setting screen 321-1 to the electronic whiteboard (synchronization source) 2α. The electronic whiteboard (synchronization source) 2α is selected among the electronic whiteboards 2 by the administrator as a synchronization source, and the IP address and the like thereof are known in advance.

S2-1: The web server unit 13 of the electronic whiteboard (synchronization source) 2α transmits the web page of the setting information setting screen 321-1 in response to the acquisition request for the setting information setting screen 321-1.

S3-1: The display control unit 33 of the terminal device 30 displays the setting information setting screen 321-1. When the administrator appropriately sets the setting information, the operation receiving unit 32 receives the operation.

S4-1: The communication unit 31 of the terminal device 30 transmits the setting information to the electronic whiteboard (synchronization source) 2α.

S5-1: The web server unit 13 of the electronic whiteboard (synchronization source) 2α receives the setting information, and the setting information receiving unit 12 stores the setting information in the communication acquisition information storage unit 194.

FIG. 12B illustrates an example of a sequence diagram of a process of setting the setting information by the UI setting.

S1-2: When the administrator operates the electronic whiteboard (synchronization source) 2α, the communication unit 31 operates to display the setting information setting screen 321-2 and the setting information setting screen 321-3.

S2-2: The administrator appropriately sets the setting information.

S3-2: The setting receiving unit 11 of the electronic whiteboard (synchronization source) 2α receives the setting.

S4-2: The setting receiving unit 11 stores the setting information in the current setting information storage unit 193.

FIG. 12C illustrates an example of a sequence diagram of a process of setting the setting information collectively by the web setting.

S1-3: When the administrator operates the terminal device 30, the communication unit 31 transmits an acquisition request for the synchronization source setting screen 301 to the electronic whiteboard (synchronization source) 2α. The electronic whiteboard (synchronization source) 2α is selected among the electronic whiteboards 2 by the administrator for the synchronization source, and the IP address and the like thereof are known in advance.

S2-3: The web server unit 13 of the electronic whiteboard (synchronization source) 2α transmits the web page of the synchronization source setting screen 301 in response to the acquisition request for the synchronization source setting screen 301.

S3-3: The display control unit 33 of the terminal device 30 displays the synchronization source setting screen 301. When the administrator clicks (presses) the upload button 312 in the batch setting area 311 of the setting information, the operation receiving unit 32 receives the operation.

S4-3: The communication unit 31 of the terminal device 30 transmits all of the setting information to the electronic whiteboard (synchronization source) 2α.

S5-3: The web server unit 13 of the electronic whiteboard (synchronization source) 2α receives all of the setting information, and the setting information receiving unit 12 stores the setting information in the communication acquisition information storage unit 194.

<Example of Setting Information>

FIG. 13 illustrates an example of the setting information in which a group is set for each item. The example setting information illustrated in FIG. 13 is transmitted in an XML format. The XML format represents a data format in which an item (also referred to as an element) is surrounded by a tag. FIG. 13(a) is a piece of the setting information corresponding to an item of printer address as one example, and "192.168.10.01" is a value of the item.

When the administrator sets a group for an item, attributes of XML is used. FIG. 13(b) is a piece of the setting information corresponding to an item of printer address to which a group is set as an attribute.

"group=" is an attribute, and "1" is a value of the attribute (in this case, a group). As described above, a group can be set for each item.

In addition, as illustrated in FIG. 13(c), along with the item value, a group value may be designated as an element. In FIG. 13(c), the item value and the group value are described in parallel as elements. Further, as illustrated in FIG. 13(d), the setting information may be in a JavaScript Object Notation (JSON) format, and the group value may be designated in the JSON format. In addition, the setting information may be text data, Comma-Separated Values (CSV) data, or the like.

The administrator uploads the above-described text data from the terminal device 30 to the electronic whiteboard (synchronization source) 2α using the batch setting area 311. This case uses the web setting. Alternatively, by displaying a group setting field for each item on the setting information setting screens 321-1 to 321-3, the administrator or the like can set the group even using the UI setting.

As described above, when the setting information and the group are integrated, each of the synchronization acquisition setting information storage unit 196, the current setting information storage unit 193, and the communication acquisition information storage unit 194 also includes the group information 197.

<Operation Process>

Figure 14:
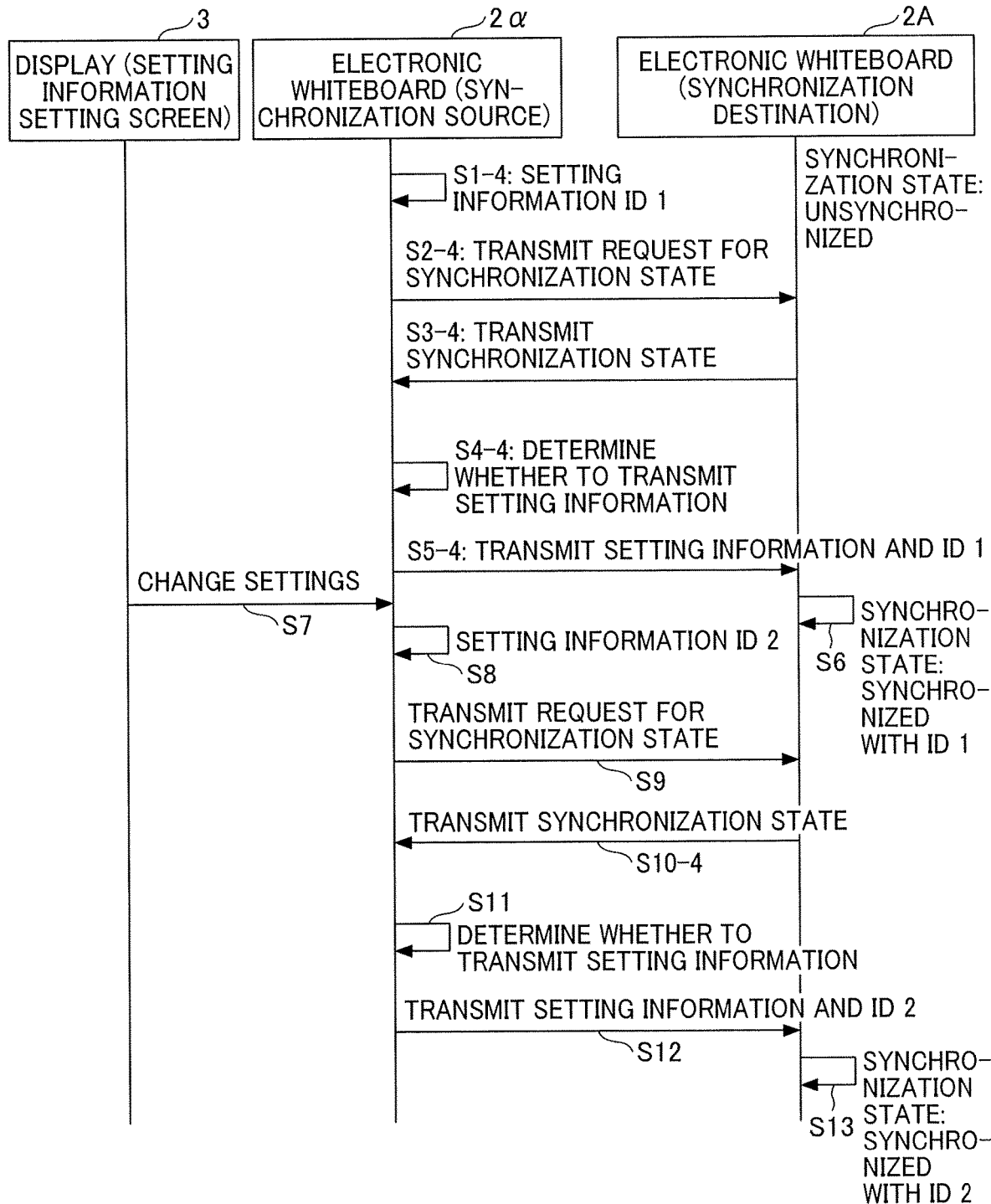
FIG. 14 illustrates an example of a sequence diagram of a process in which the electronic whiteboard that is the synchronization source transmits the setting information to the electronic whiteboard that is the synchronization destination according to the one of the embodiments.

FIG. 14 illustrates an example of a sequence diagram of a process in which the electronic whiteboard (synchronization source) 2α transmits the setting information to the electronic whiteboard (synchronization destination) 2.

S1-4: The setting information transmission unit 14 of the electronic whiteboard (synchronization source) 2α assigns identification information, ID1, to the setting information. The setting information is currently stored in the current setting information storage unit 193.

S2-4: When the synchronization timing comes, the setting information transmission unit 14 of the electronic whiteboard (synchronization source) 2α transmits a request for the synchronization state to the electronic whiteboard (synchronization destination) 2A using the IP address registered as a destination in the synchronization destination list.

S3-4: The synchronization information receiving unit 16 of the electronic whiteboard (synchronization destination) 2A reads the synchronization state from the synchronization destination setting design storage unit 198 to transmit to the electronic whiteboard (synchronization source) 2α.

Figure 15:
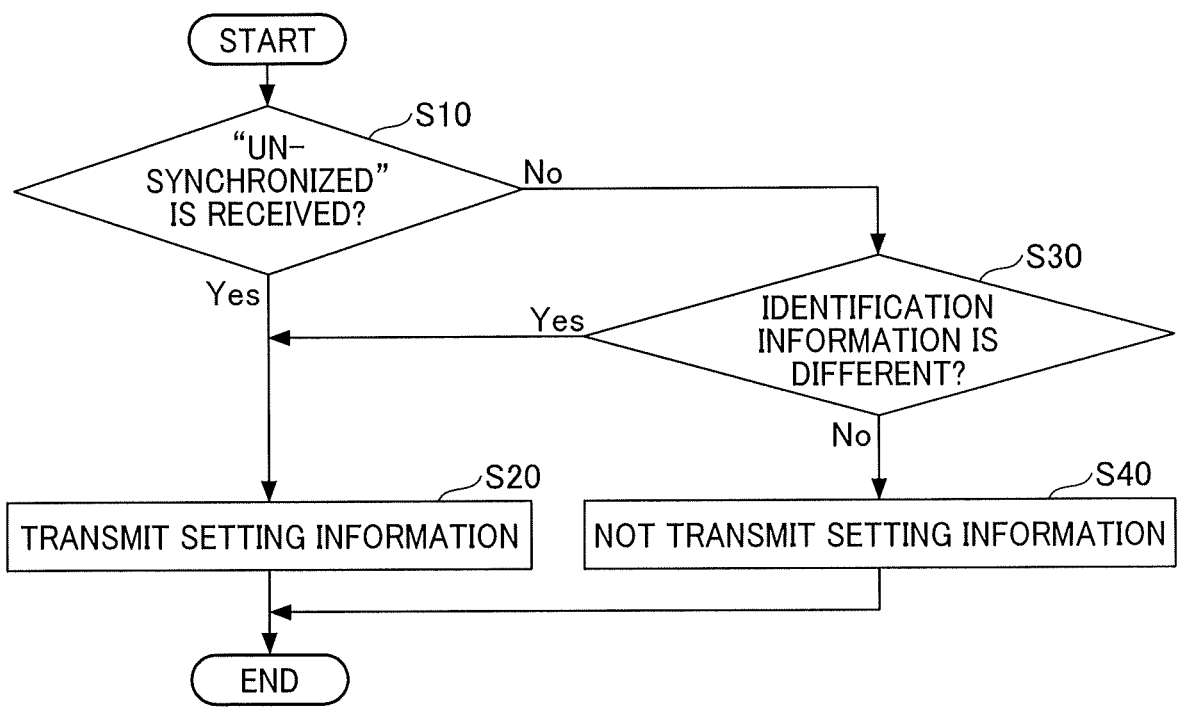
FIG. 15 illustrates an example of a flowchart of a process of determining whether to transmit the setting information based on a synchronization state and identification information of the setting information, which is performed by the electronic whiteboard that is the synchronization source according to the one of the embodiments.

S4-4: The setting information transmission unit 14 of the electronic whiteboard (synchronization source) 2α receives the synchronization state and determines whether or not to transmit the setting information. A flowchart of a process of the above-mentioned determination is illustrated in FIG. 15. In the example embodiment, "Unsynchronized" is received in S4-4 of FIG. 14.

S5-4: Upon receiving "Unsynchronized", the setting information transmission unit 14 of the electronic whiteboard (synchronization source) 2α transmits the setting information and identification information (ID1) stored in the current setting information storage unit 193 to the electronic whiteboard (synchronization destination) 2A.

S6: The synchronization information receiving unit 16 of the electronic whiteboard (synchronization destination) 2A receives the setting information and the identification information (ID1), causes the synchronization acquisition setting information storage unit 196 to store the received setting information and the identification information (ID1), sets the synchronization state to "Synchronized", and set the identification information (ID1).

S7: The administrator sets the setting information via the display 3 of the electronic whiteboard (synchronization source) 2α (UI setting).

S8: The setting information transmission unit 14 of the electronic whiteboard (synchronization source) 2α assigns identification information, ID2, to the setting information.

S9: When the synchronization timing comes, the setting information transmission unit 14 of the electronic whiteboard (synchronization source) 2α transmits a request for the synchronization state to the electronic whiteboard (synchronization destination) 2A using the IP address registered as a destination in the synchronization destination list.

S10-4: The synchronization information receiving unit 16 of the electronic whiteboard (synchronization destination) 2A reads the synchronization state ("Synchronized") and the identification information (ID1) from the synchronization destination setting design storage unit 198 to transmit to the electronic whiteboard (synchronization source) 2α.

S11: The setting information transmission unit 14 of the electronic whiteboard (synchronization source) 2α receives the synchronization state ("Synchronized") and the identification information ID1, and determines whether to transmit the setting information by comparing the identification information ID2 with the identification information ID1. In S11 of FIG. 14, the identification information ID1 is determined to be different from the identification ID2, and the setting information transmission unit 14 determines to transmit the setting information.

S12: The setting information transmission unit 14 of the electronic whiteboard (synchronization source) 2α transmits the setting information and identification information (ID2) stored in the current setting information storage unit 193 to the electronic whiteboard (synchronization destination) 2A.

S13: The synchronization information receiving unit 16 of the electronic whiteboard (synchronization destination) 2A receives the setting information and the identification information (ID2), causes the synchronization acquisition setting information storage unit 196 to store the received setting information and the identification information (ID2), sets the synchronization state to "Synchronized", and set the identification information (ID2).

As described above, the electronic whiteboard (synchronization source) 2α determines whether to transmit the setting information based on the synchronization state and the identification information of the setting information. When the electronic whiteboard (synchronization source) 2α determines not to transmit, the communication load can be reduced.

FIG. 15 illustrates an example flowchart of a process of determining whether to transmit the setting information based on the synchronization state and the identification information of the setting information, which is performed by the electronic whiteboard (synchronization source) 2α. The process illustrated in FIG. 15 starts when the electronic whiteboard (synchronization source) 2α receives the synchronization state.

The setting information transmission unit 14 of the electronic whiteboard (synchronization source) 2α determines whether "Unsynchronized" is received as the synchronization state (S10).

If the determination in S10 is Yes, the setting information transmission unit 14 determines to transmit the setting information (S20).

If the determination in S10 is No, the setting information transmission unit 14 determines whether the identification information to be transmitted is different from the identification information transmitted from the electronic whiteboard (synchronization destination) 2 (S30).

If the determination in S30 is Yes, the setting information transmission unit 14 determines to transmit the setting information (S20).

If the determination in S30 is No, the setting information transmission unit 14 determines not to transmit the setting information (S40).

As described above, the setting information transmission unit 14 of the electronic whiteboard (synchronization source) 2α transmits the setting information to perform the synchronization only when the electronic whiteboard (synchronization destination) 2 does not previously receive the setting information or when the different identification information is received from the electronic whiteboard (synchronization destination) 2.

<Process of Reflecting on Electronic Whiteboard (Synchronization Destination)>

In the case of the UI setting, the setting information is reflected on the electronic whiteboard (synchronization destination) 2 in real time, however in the case of the web setting and the synchronization setting, setting information is reflected on the electronic whiteboard (synchronization destination) 2 by restarting. The electronic whiteboard (synchronization destination) 2 restarts in the case of the web setting and the synchronization setting to prevent the setting information from being changed during a user operation. In the case of the UI setting, the settings are changed by the user so that changes in the setting information does not any problem. Such changes are preferably reflected rapidly.

Figure 16:
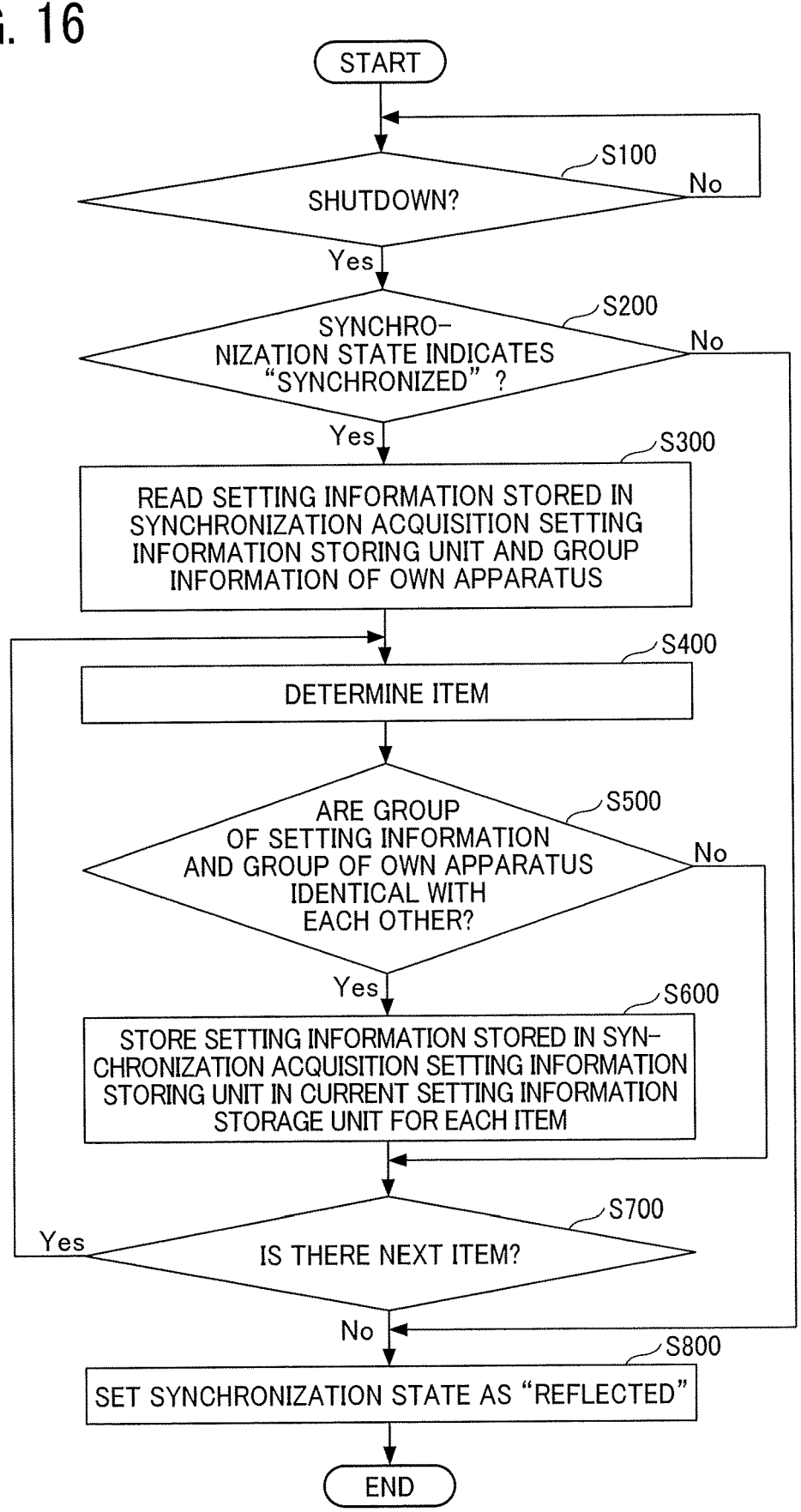
FIG. 16 illustrates an example of a flowchart of a process of reflecting the setting information on the electronic whiteboard that is the synchronization destination according to the one of the embodiments.

FIG. 16 illustrates an example flowchart of a process of reflecting the setting information on the electronic whiteboard (synchronization destination) 2. In the example of FIG. 16, the setting information is reflected by shutdown and restart.

The setting information reflection unit 15 of the electronic whiteboard (synchronization destination) 2 determines whether the electronic whiteboard (synchronization destination) 2 shuts down (S100). The shutdown is executed by the user at the restart timing set in the synchronization destination setting design storage unit 198.

The setting information reflection unit 15 determines whether the synchronization state is "Synchronized" during shutdown processing of the electronic whiteboard 2 (S200). Here, the shutdown processing is defined as processing including saving data that is not previously saved, closing a file, etc.

If the synchronization state is not "Synchronized", the setting information is not acquired from the since the setting information is not acquired from the electronic whiteboard (synchronization source) 2α during operating, the process of FIG. 16 ends.

When the synchronization state is "Synchronized", the setting information reflection unit 15 reads the setting information stored in the synchronization acquisition setting information storage unit 196 and the group information 197, which is information of the electronic whiteboard (synchronization destination) 2 (S300). The same processing can be applied to the setting information stored in the communication acquisition information storage unit 194.

Then, the setting information reflection unit 15 determines one of the items in the setting information stored in the synchronization acquisition setting information storage unit 196 (S400). Synchronization of the setting information is performed for each item. An order associated with determination may be in an order of description in the setting information, in an alphabetical order, or in any order.

The setting information reflection unit 15 determines whether the group set for the determined item in the setting information received from the electronic whiteboard (synchronization source) 2α matches the group set for the electronic whiteboard (synchronization destination) 2 (S500).

If the groups do not match, the setting information reflection unit 15 does not apply reflection for the item in the current setting information storage unit 193.

If the groups match, the setting information reflection unit 15 stores, for each item, the setting information stored in the synchronization acquisition setting information storage unit 196 in the current setting information storage unit 193 (S600). Accordingly, the electronic whiteboard (synchronization destination) 2, when starting up next time, operates based on the setting information stored in the current setting information storage unit 193.

Then, the setting information reflection unit 15 determines whether there is a next item in the setting information stored in the synchronization acquisition setting information storage unit 196 (S700).

If the determination in S700 is Yes, the process proceeds to S400. If the determination in S700 is No, the setting information reflection unit 15 sets the synchronization state to "Reflected", and sets the identification information for the setting information (S800).

As described above, the communication system according to the embodiment synchronizes the setting information for each item by determining whether the group set for each item matches the group set for the item in the setting information.

<Example of Setting>

Figure 17:
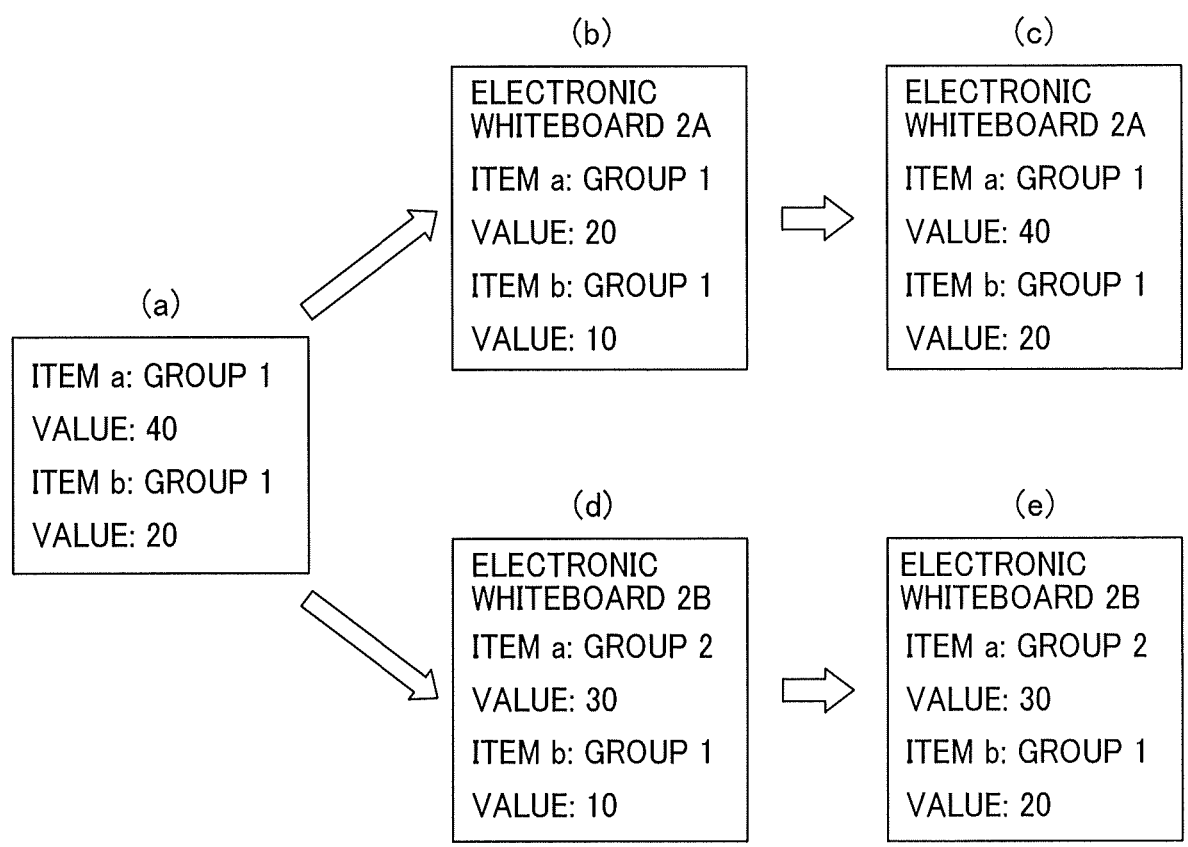
FIG. 17 illustrates an example of update of the setting information for each item performed by the electronic whiteboards that are the synchronization destinations according to the one of the embodiments.

A description is given of an example of the setting with reference to FIG. 17. FIG. 17 illustrates update of the setting information for each item performed by the electronic whiteboards (synchronization destinations) 2A and 2B.

FIG. 17(a) illustrates the setting information transmitted by the electronic whiteboard (synchronization source) 2α. An item "a" has a group 1 and a value of 40, an item "b" has the group 1 and a value of 20 in. As illustrated in FIG. 17(b), regarding the electronic whiteboard (synchronization destination) 2A, the item "a" has the group 1, and the item "b" also has the group 1. The groups for the items a and b are the same as that of the electronic whiteboard (synchronization source) 2α, values of the items a and b of the electronic whiteboard (synchronization destination) 2A are changed to 40 and 20, respectively, as illustrated in FIG. 17(c).

Further, as illustrated in FIG. 17(d), regarding the electronic whiteboards (synchronization destinations) 2B, the item "a" has a group 2 and a value of 30, and the item "b" has the group 1 and a value of 10. In this case, the groups for the item "a" does not match, but the groups for the item "b" matches. Accordingly, the item "a" does not change, but the item "b" changes to 20 in the electronic whiteboards (synchronization destinations) 2B, as illustrated in FIG. 17(e).

As described above, the communication system 100 according to the first embodiment determine to synchronize the setting information for each item by setting a group for each item.

Second Embodiment

In a second embodiment, a description is given of a communication system 100 that uses an initial value of the setting information as a group.

By setting a group for each item, whether to synchronize for each item can be determined. In the second embodiment, a specific example of the group is described. If the administrator or the like is not required to set the group for each item of each of the electronic whiteboards 2, an increase in the workload can be suppressed. The group in the first embodiment includes one or more electronic whiteboards 2 in which the same value is to be set in the same item. The electronic whiteboards 2 in which the same value is to be set in the same item are, for example, the electronic whiteboards 2 each having the same model and the same model number.

The model and the model number are determined automatically when the electronic whiteboard 2 is determined, the group is determined depending on the electronic whiteboard 2. As a piece of information determined depending on the electronic whiteboard 2, there is an initial value of the setting information. The initial value of the setting information is a value of each item of the setting information stored in the initial setting information storage unit 191. Accordingly, the value of the setting information at a time of shipment becomes a group. The setting information at the time of the shipment is saved without being deleted or changed so that the electronic whiteboard 2 can use the value at the time of the shipment again even after the electronic whiteboard 2 is shipped.

The setting information at the time of the shipment is determined in consideration of, for example, a model, a model number, a series name, a release time, a type or a version of OS, and/or a version of application or firmware of the electronic whiteboard 2. Accordingly, when the electronic whiteboards 2 have the same initial values, the electronic whiteboards 2 usually or often are classified in the same group for the synchronization of the setting information.

Alternatively, the initial value may be determined in consideration of the usage condition, such as a place where the electronic whiteboard 2 is arranged and usage frequency of the electronic whiteboard 2. Accordingly, when the usage situation is considered for grouping, the initial value can be used for the group.

In the embodiment, by using the initial value for grouping, the administrator can update the setting information for each item without determining a group of the electronic whiteboard 2 in advance or setting a group using any information processing apparatus.

In the second embodiment and the following embodiments, a third embodiment, a fourth embodiment, and a fifth embodiment, the same reference numerals as the first embodiment are assigned to the same or like elements. Accordingly, a description is given of main elements in each embodiment below.

<Generating Setting Information for Synchronization>

Figure 18:
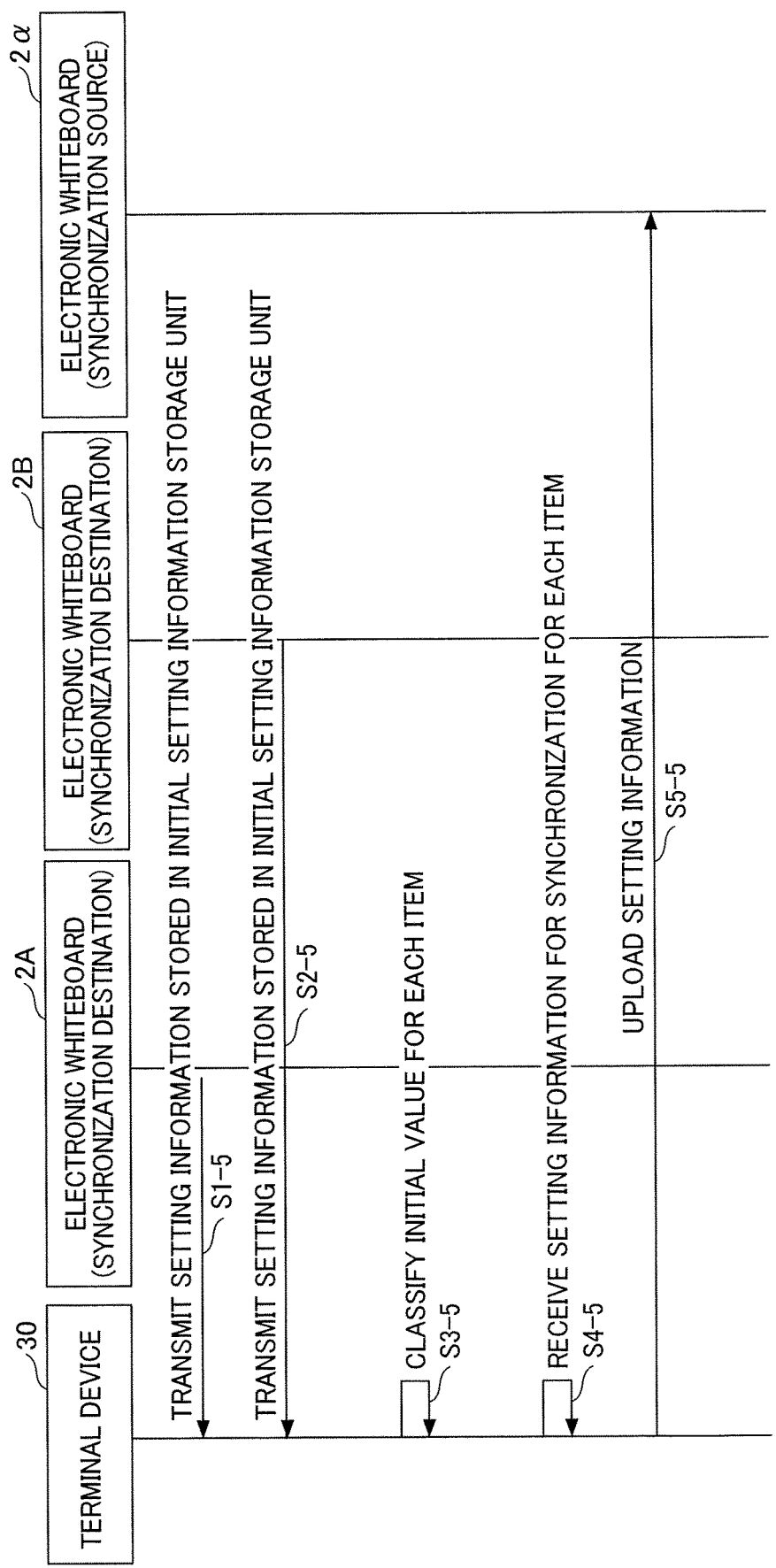
FIG. 18 illustrates an example of a sequence diagram of a process of generating the setting information for synchronization with the terminal device according to the one of the embodiments.

FIG. 18 illustrates an example of a sequence diagram of a process of generating the setting information for the synchronization with the terminal device 30.

S1-5, S2-5: When the administrator operates the terminal device 30, the communication unit 31 of the terminal device 30 acquires the setting information stored in the initial setting information storage unit 191 from each of the electronic whiteboards (synchronization destinations) 2A and 2B.

S3-5: The display control unit 33 of the terminal device 30 displays on the LCD 206 the initial values classified for each item in the setting information. In other words, the display control unit 33 of the terminal device 30 displays the initial value of the electronic whiteboards (synchronization destinations) 2A and 2B.

S4-5: The administrator sets the setting information (value) for each item, by considering which value is appropriate for the each of the electronic whiteboard 2 having the displayed initial value based on the initial value for each item. The initial value is used as a group. Additionally, the terminal device 30 may acquire the current setting information from each electronic whiteboard 2 in S1-5 and S2-5 and display the setting information to assist the determination made by the administrator.

S5-5: The administrator operates the terminal device 30 to upload the setting information.

Figure 19:
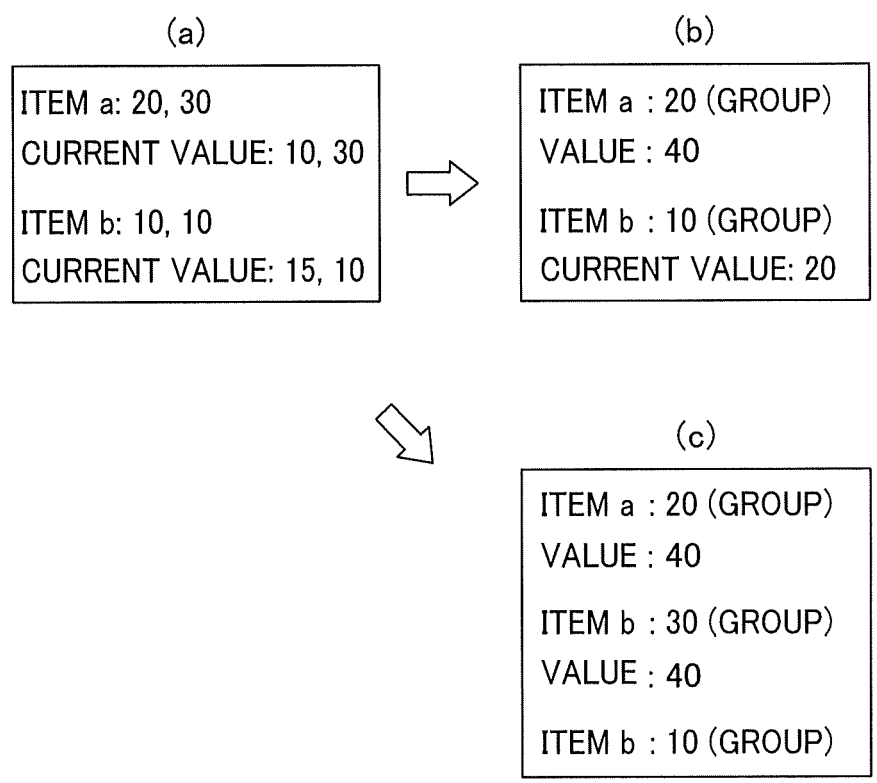
FIG. 19 illustrates an example of the setting information set by the administrator according to the one of the embodiments.

FIG. 19 illustrates an example of the setting information that is set by the administrator. FIG. 19(a) illustrates the setting information, which is stored in the initial setting information storage unit 191, acquired from each of the electronic whiteboard (synchronization destination) 2A and the electronic whiteboard (synchronization destination) 2B. FIG. 19(b) illustrates the setting information set by the administrator.

As illustrated in FIG. 19(a), initial values of 20 and 30 are obtained for the item "a", and initial values of 10 and 10 are obtained for the item "b". When determining that the item "a" of the electronic whiteboard 2 whose initial value is 20 should be a value of 40 in relation to the item "a", the administrator designates the initial value of 20, which is for the item "a", to be reset to 40, resulting in the setting information as illustrated in FIG. 19(b). Similarly, when determining that the item "b" of the electronic whiteboard 2 whose initial value is 10 should be a value of 20 in relation to the item "b", the administrator designates the initial value of 10, which is for the item "b", to be reset to 20, resulting in the setting information as illustrated in FIG. 19(b).

As illustrated in FIG. 19(c), the same item may be set in the setting information. the groups for the same items are different from each other, and the electronic whiteboard (synchronization destination) 2 may be synchronized when having the same group.

The processing as illustrated in FIG. 19(a) is not necessarily indispensable, and when the administrator manages the initial value of the electronic whiteboard (synchronization destination) 2, the administrator may directly set the setting information as illustrated in FIG. 19(b).

<Process of Reflecting on Electronic Whiteboard (Synchronization Destination) 2>

Figure 20:
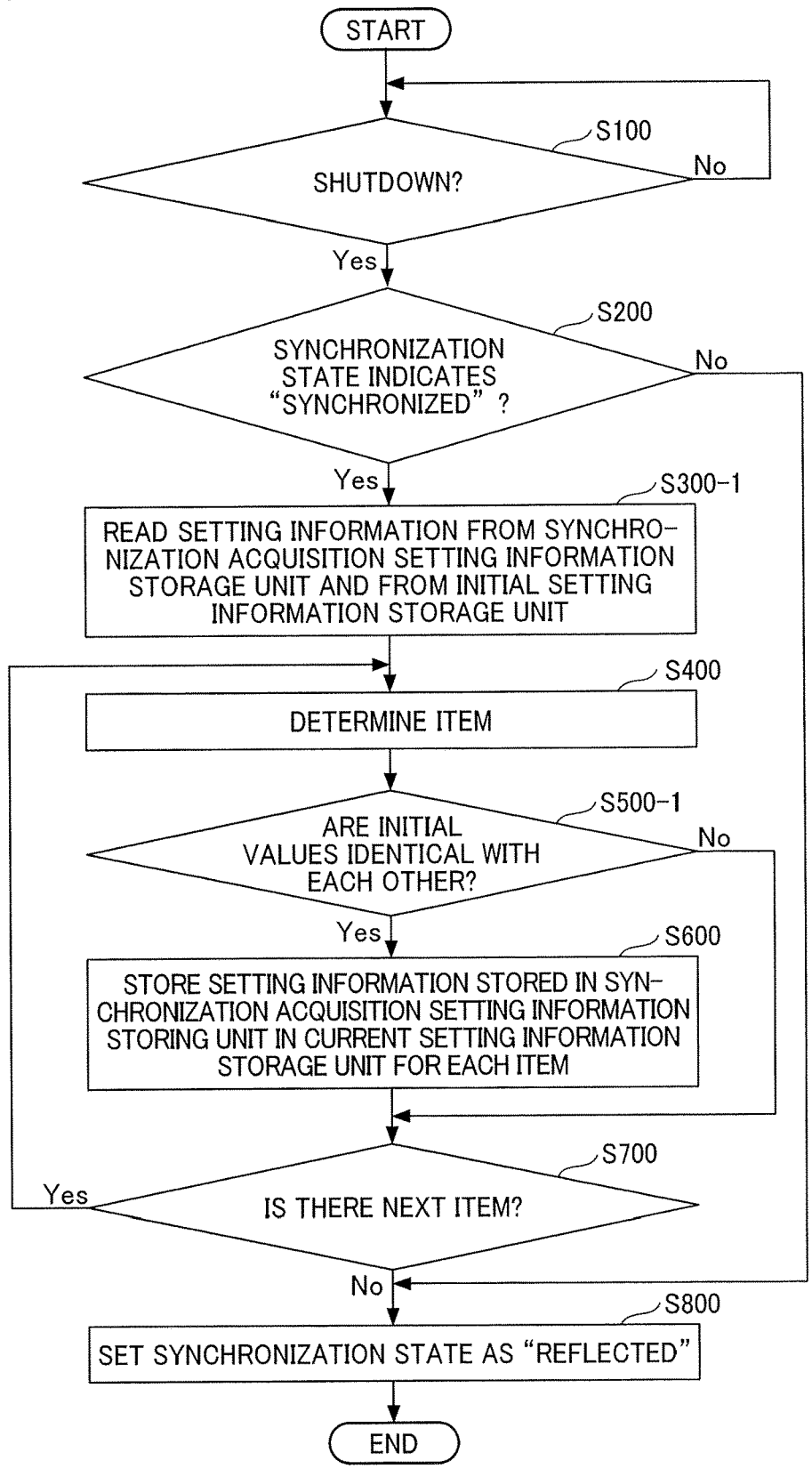
FIG. 20 illustrates an example of a flowchart of a process of reflecting the setting information on the electronic whiteboard that is the synchronization destination according to another one of the embodiments (second embodiment)

FIG. 20 illustrates an example flowchart of a process of reflecting the setting information on the electronic whiteboard (synchronization destination) 2. In the following description on FIG. 20, the differences from FIG. 16 are described. The steps of S100 and S200 are substantially the same as that of FIG. 16.

If the synchronization state indicates "Synchronized", the setting information reflection unit 15 reads the setting information from the synchronization acquisition setting information storage unit 196 and the initial setting information storage unit 191 (S300-1).

Then, the setting information reflection unit 15 determines one of the items from the setting information read from the synchronization acquisition setting information storage unit 196 (S400).

The setting information reflection unit 15 retrieves the initial value (group) from the setting information read from the synchronization acquisition setting information storage unit 196 for the determined item and determines whether the retrieved initial value matches the value (initial value) of the setting information read from the initial setting information storage unit 191 (S500-1).

If the above values do not match, the synchronization is not to be performed so that the setting information reflection unit 15 does not reflect the item on the current setting information storage unit 193.

If the above values match, the setting information reflection unit 15 stores, for each item, the setting information stored in the synchronization acquisition setting information storage unit 196 in the current setting information storage unit 193 (S600). The subsequent steps of the process are the same as that in FIG. 16.

Therefore, the communication system according to the embodiment can update the setting information for each item by grouping using the initial value, without administrator's operation of determining a group of the electronic whiteboards 2, determining a group in advance using any information processing apparatuses, etc.

Third Embodiment

Hereinafter, a description is given of a communication system 100 according to a third embodiment in which grouping is performed by determining whether the electronic whiteboard 2 has a function related to the setting information.

In the second embodiment, the initial value is described as information determined depending on the electronic whiteboard 2. As other information depending on the electronic whiteboard 2, there is a function included in the electronic whiteboard 2. For example, when there is a first type of the electronic whiteboard that has a function of a videoconference terminal and a second type of the electronic whiteboard that does not have the function of a videoconference terminal, the first type of the electronic whiteboard having the function of the videoconference terminal has a setting value suitable for the function of the videoconference terminal. Accordingly, when the communication system 100 synchronizes the settings related to the function associated with the videoconference terminal, grouping can be performed by determining whether the electronic whiteboard 2 has the function associated with the videoconference terminal. That is, presence or absence of any function can be used for grouping.

Alternatively, the presence or the absence of the function may be determined in consideration of the usage condition, such as a place where the electronic whiteboard 2 is arranged and usage frequency of the electronic whiteboard 2. Accordingly, when considering the usage condition for grouping, the presence or the absence of the function can be used for the group.

As illustrated in FIG. 21, the terminal device 30 has association information used for determining items that is to be set due to the presence of the function. The association information is information associating each function with one or more items having possibility to be set. The electronic whiteboard (synchronization source) 2α determines the function required for each item by acquiring the function of the electronic whiteboard (synchronization destination) 2 from the electronic whiteboard (synchronization destination) 2. The administrator can designate the function (group) for each item by using this.

<Generating Setting Information for Synchronization>

FIG. 22 illustrates an example of a sequence diagram of a process of generating the setting information for the synchronization with the terminal device 30. In the following description on FIG. 22, the differences from FIG. 18 are described.

S1-6, S2-6: When the administrator operates the terminal device 30, the communication unit 31 of the terminal device 30 acquires function information on the function from each of the electronic whiteboard (synchronization destination) 2A and the electronic whiteboard (synchronization destination) 2B. The function information is to be described later.

S3-6: The display control unit 33 of the terminal device 30 classifies the functions for each item to be displayed on the LCD 206, with reference to the association information illustrated in FIG. 21. An example of the display is illustrated in FIG. 23(a). That is, according to a type of function included in the electronic whiteboard (synchronization destination) 2, the item, which is settable for the type of function, is specified, and the function is displayed associated with the item.

S4-6: The administrator considers what value is appropriate for the electronic whiteboard 2 having the function with reference to the function for each item, sets the setting information (value) for synchronization by designating the function for each item. The function is used as a group. Additionally, the terminal device 30 may acquire the current setting information from each electronic whiteboard 2 in S1-6 and S2-6 and display the setting information to assist the determination made by the administrator.

S5-6: The administrator operates the terminal device 30 to upload the setting information.

Figure 23:
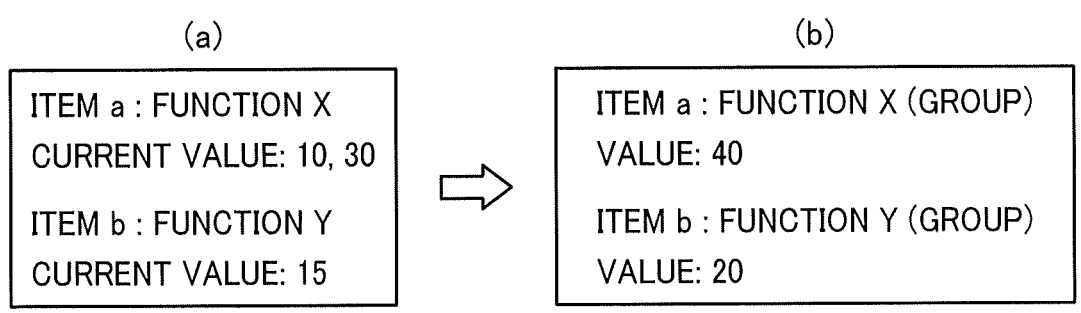
FIG. 23 illustrates an example of the setting information set by the administrator according to the second embodiment.

FIG. 23 illustrates an example of the setting information that is set by the administrator. FIG. 23(a) illustrates the setting information that is generated based on the function information acquired from the electronic whiteboard (synchronization destination) 2A and the electronic whiteboard (synchronization destination) 2B and indicates correspondence between the functions and items. FIG. 23(b) illustrates the setting information set by the administrator.

Referring to FIG. 23(a), a function X is associated with an item "a", and a function Y is associated with an item "b". In the embodiment, both the electronic whiteboard (synchronization destination) 2A and the electronic whiteboard (synchronization destination) 2B have the function X and only the electronic whiteboard (synchronization destination) 2A has the function Y, for example. The values of the item "a" of the electronic whiteboard (synchronization destination) 2A and the electronic whiteboard (synchronization destination) 2B having the function X are 10 and 30, respectively, and the value of the item "b" of the electronic whiteboard (synchronization destination) 2A having the function Y is 15.

When determining that a value of the item "a" of the electronic whiteboard (synchronization destination) 2A, which has the function X, should be a value of 40, the administrator sets the setting information in which the value 40 is set to the item "a", as illustrated in FIG. 23(b). Accordingly, the item "a" of the electronic whiteboard (synchronization destination) 2A and the electronic whiteboard (synchronization destination) 2B, which have the function X, can be synchronized.

Similarly, when determining that a value of the item "a" of the electronic whiteboard 2A (synchronization destination), which has the function Y, should be a value of 20, the administrator sets the setting information in which the value 20 is set to the item "b", as illustrated in FIG. 23(b). Accordingly, it is possible that the value of the item "b" of the electronic whiteboard (synchronization destination) 2A, which has the function Y, is synchronized to be set to 20, and the value of the item "b" of the electronic whiteboard (synchronization destination) 2B, which does not have the function Y, is not synchronized.

As an example of the function, in addition to the function as the above-described videoconference terminal, a size of the display 3, a type of interface of a video image, a type of touch panel, a type of electronic pen, or the like may be used. In addition, if the functions are different depending on a model, a model number, a type or a version of OS, an application or a firmware version, or the like, each of the above is also regarded as a function.

The processing as illustrated in FIG. 23(a) is not necessarily indispensable, and when the administrator manages the function of the electronic whiteboard (synchronization destination) 2, the administrator may directly set the setting information as illustrated in FIG. 23(b).

<Process of Reflecting on Electronic Whiteboard (Synchronization Destination) 2>

Figure 24:
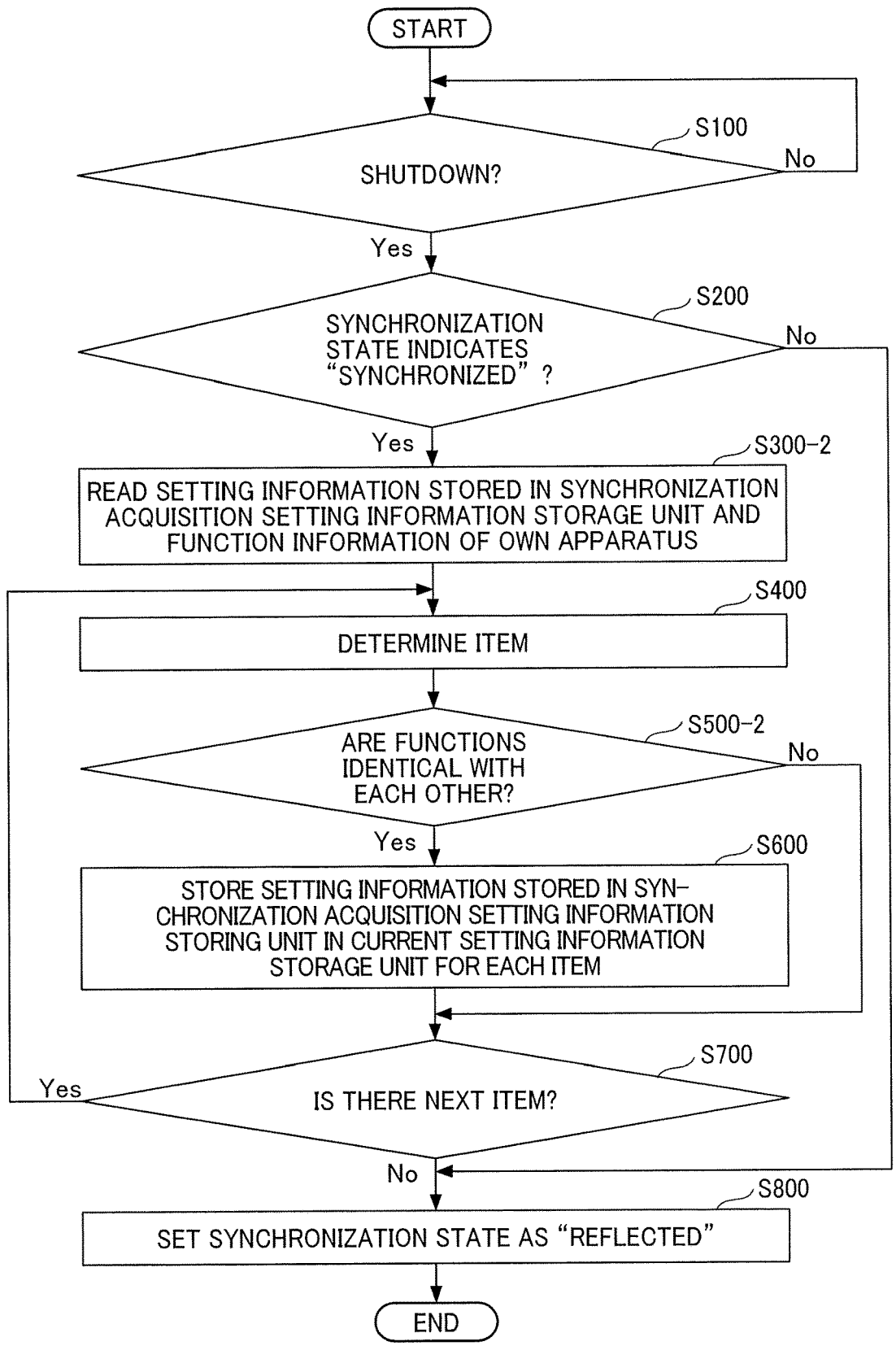
FIG. 24 illustrates an example of a flowchart of a process of reflecting the setting information on the electronic whiteboard that is the synchronization destination according to still another one of the embodiments (third embodiment)

FIG. 24 illustrates an example flowchart of a process of reflecting the setting information on the electronic whiteboard (synchronization destination) 2. In the following description on FIG. 24, the differences from FIG. 16 are described. The steps of S100 and S200 are substantially the same as that of FIG. 16.

When the synchronization state indicates "Synchronized", the setting information reflection unit 15 reads the setting information from the synchronization acquisition setting information storage unit 196 and the function information of the own apparatus (S300-2).

Then, the setting information reflection unit 15 determines one of the items from the setting information read from the synchronization acquisition setting information storage unit 196 (S400).

The setting information reflection unit 15 retrieves the function from the setting information read from the synchronization acquisition setting information storage unit 196 for the determined item and determines whether the retrieved function matches the function (group) of the own apparatus (S500-2).

If the above functions do not match, the synchronization is not to be performed so that the setting information reflection unit 15 does not reflect the item on the current setting information storage unit 193.

If the above functions match, the setting information reflection unit 15 stores, for each item, the setting information read from the synchronization acquisition setting information storage unit 196 in the current setting information storage unit 193 (S600). The subsequent steps of the process are the same as that in FIG. 16.

Therefore, the communication system according to the embodiment can update the setting information for each item by grouping using the function included in the electronic apparatus, without administrator's operation of determining a group of the electronic whiteboards 2, determining a group in advance using any information processing apparatuses, etc.

Fourth Embodiment

Hereinafter, a description is given of a communication system 100 according to a fourth embodiment that reflects setting information when a group is not set in the setting information in the first embodiment to the third embodiment.

In the setting information, there are items commonly set for many of the electronic whiteboards 2. For example, a mail server and a shutdown time are commonly set for many of the electronic whiteboards 2, and values for them are often the same. However, these electronic whiteboards 2 are not always belonging to the same group. In this case, it is troublesome for the administrator or the like to designate the group for each item. If the administrator or the like is not required to set the groups for many items, workload can be reduced, and an amount of transmission from the electronic whiteboard (synchronization source) 2α to the electronic whiteboard (synchronization destination) 2 can be reduced.

Figure 25:
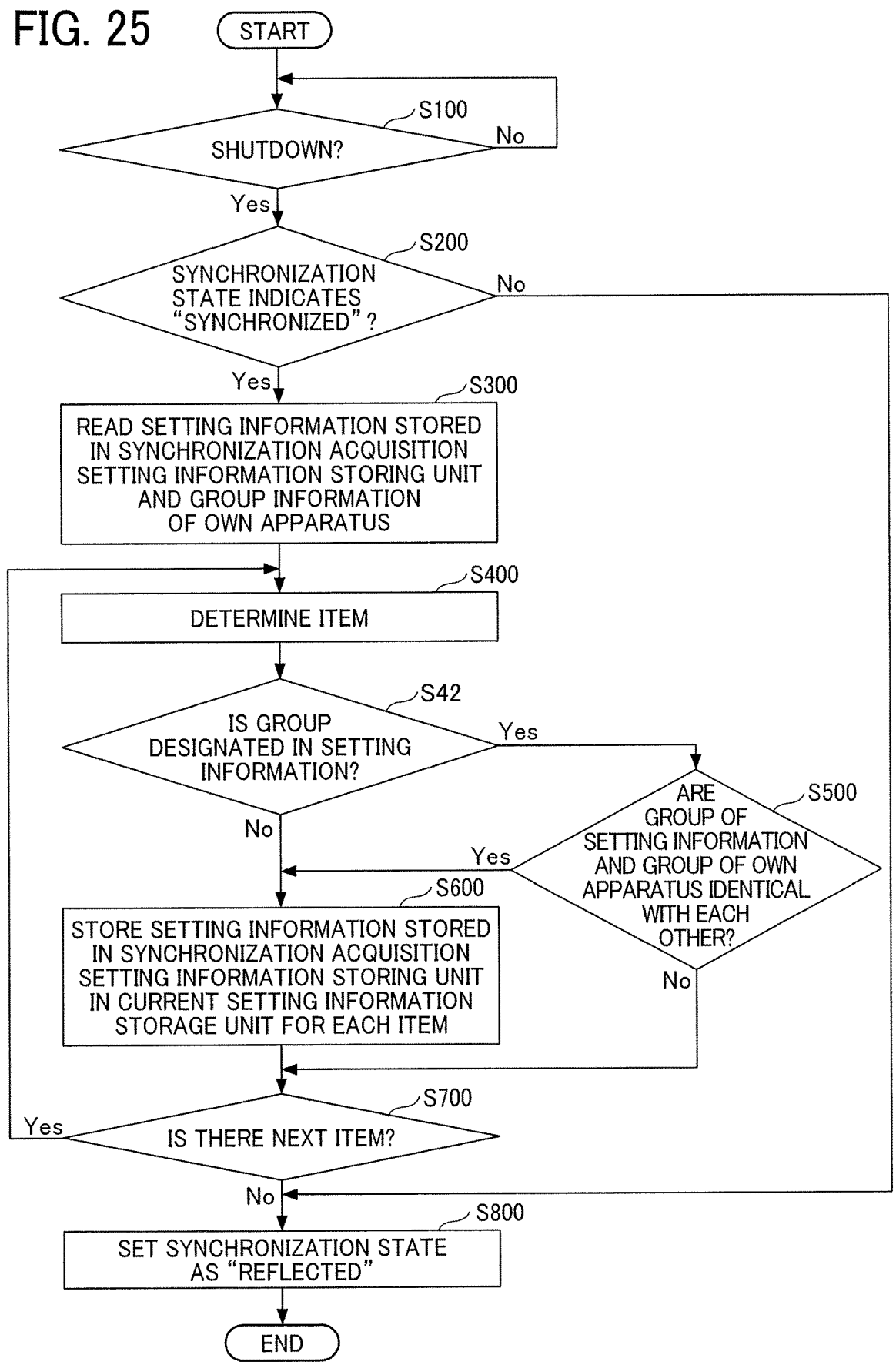
FIG. 25 illustrates an example of a flowchart of a process of reflecting the setting information on the electronic whiteboard that is the synchronization destination according to still another one of the embodiments (fourth embodiment)

FIG. 25 illustrates an example flowchart of a process of reflecting the setting information on the electronic whiteboard (synchronization destination) 2. In the following description on FIG. 25, the differences from FIG. 16 are described. The steps of S100 and S400 are substantially the same as that of FIG. 16.

The setting information reflection unit 15 of the electronic whiteboard (synchronization destination) 2 determines whether a group is designated for each item of the setting information (S42). For example, when the setting information is in an XML format, the electronic whiteboard (synchronization destination) 2 determines whether an attribute is set.

If the group is not designated, the process proceeds to S600, and the setting information reflection unit 15 stores the setting information read from the synchronization acquisition setting information storage unit 196 in the current setting information storage unit 193 for each item (S600). When the group is designated, the process proceeds to S500, and the subsequent steps of the process is substantially the same as that in FIG. 16.

Therefore, the communication system 100 according to the fourth embodiment reflects the item for which the group is not designated on the electronic whiteboard 2, resulting in reduction of the workload of the administrator and the amount of the transmission from the electronic whiteboard (synchronization source) 2α to the electronic whiteboard (synchronization destination) 2.

Fifth Embodiment

Hereinafter, a description is given of a communication system 100 according to a fifth embodiment. The electronic apparatus according to the fifth embodiment does not reflect setting information when a group is not set in the setting information in the first embodiment to the third embodiment.

There is a case in which a few of items in the setting information is desired to be synchronized but most of the items in the setting information are not required to be synchronized. For example, there is a case in which the administrator wants to synchronize only the new items of a new electronic whiteboard that is newly introduced. In the above-described case, if the administrator or the like is not required to set the group of the old electronic whiteboard for each item, setting the groups for most of the items in the setting information are unnecessary and workload of the administrator and an amount of transmission from the electronic whiteboard (synchronization source) 2α to the electronic whiteboard (synchronization destination) 2 can be reduced.

Figure 26:
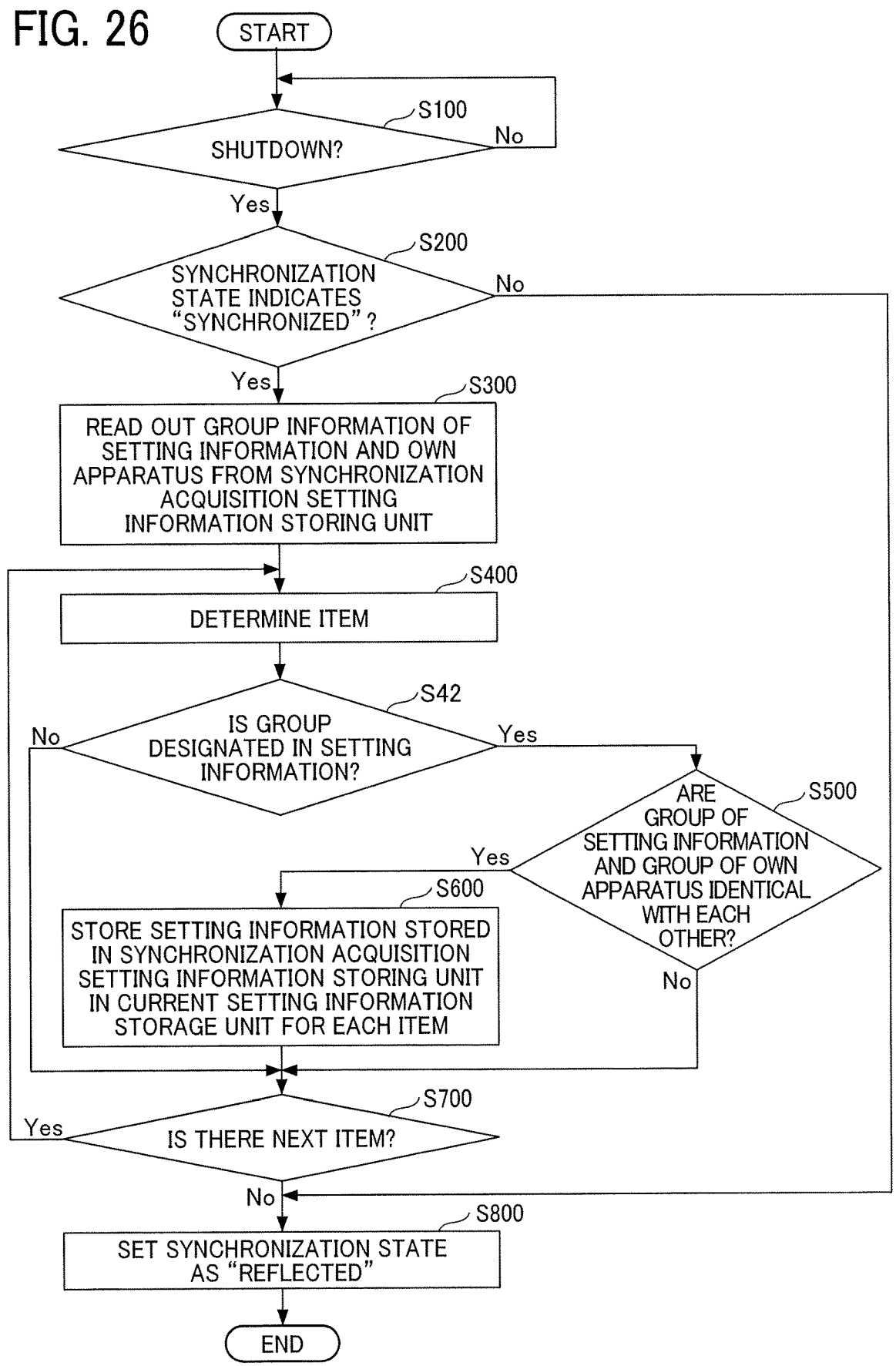
FIG. 26 illustrates an example of a flowchart of a process of reflecting the setting information on the electronic whiteboard that is the synchronization destination according to still another one of the embodiments (fifth embodiment).

FIG. 26 illustrates an example flowchart of a process of reflecting the setting information on the electronic whiteboard (synchronization destination) 2. In the following description on FIG. 26, the differences from FIG. 25 are described. The steps of S100 and S400 are substantially the same as that of FIG. 25.

The setting information reflection unit 15 of the electronic whiteboard (synchronization destination) 2 determines whether a group is designated for each item of the setting information (S42). For example, when the setting information is in an XML format, the electronic whiteboard (synchronization destination) 2 determines whether an attribute is set.

If the group is not designated, the process proceeds to step S70 and the next item is processed.

When the group is designated, the process proceeds to S50, and the subsequent steps of the process is substantially the same as that in FIG. 25.

Therefore, the communication system 100 according to the fifth embodiment does not reflect the item for which the group is not designated on the electronic whiteboard 2, resulting in reduction of the workload of the administrator and the amount of the transmission from the electronic whiteboard (synchronization source) 2α to the electronic whiteboard (synchronization destination) 2.

<Other Example for Application>

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

In the description of the above embodiments, the electronic whiteboard (synchronization source) 2α does not transmit the setting information according to the synchronization state and the identification information of the setting information. However, the electronic whiteboard (synchronization source) 2α may transmit the setting information, and then the electronic whiteboard (synchronization destination) 2 may delete the setting information according to the synchronization state and the identification information of the setting information.

Further, an IP address can be used as an example of the usage condition used for grouping. In general, the IP address of the electronic whiteboard 2 is fixed, and the IP address of the network that is determined for each department may be assigned. If there is a certain tendency in usage by department, part of IP address (e.g., a part of the network address) can be used for grouping. In addition, position information, floor information, etc. using an indoor position detection system may be used. Further, the terminal device 30 or the administrator may figure out the electronic whiteboards 2 that have the usage condition (e.g., how long the apparatus operates, when the apparatus operates) similar to each other, from operating period of time or operating time zone per day, and use the data for grouping.

In addition, the functional configuration as illustrated in FIG. 6 is divided into blocks based on main functions of the electronic whiteboard 2, in order to facilitate understanding the processes performed by the electronic whiteboard 2. No limitation is intended by how the processes are divided or by the name of the processes. The processes implemented by the electronic whiteboard 2 may be divided to a larger number of processes depending on the contents of processes. Further, one process may be divided to include a larger number of processes.

Additionally, one or more of the storage units of the storage unit 19 illustrated in FIG. 6 may be on the network.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A communication system, comprising:
a first electronic apparatus settable with first setting information for a plurality of items, the first setting information including determination information that is set for each of the plurality of items; and
a plurality of second electronic apparatuses, each second electronic apparatus including a memory configured to store the first setting information, each second electronic apparatus settable with second setting information for the plurality of items, and each second electronic apparatus being communicably connected to the first electronic apparatus, wherein
the first electronic apparatus includes first circuitry configured to transmit, to the second electronic apparatuses, the first setting information including the determination information, and
the determination information is group information used to group the plurality of items in the second setting information, the group information being determined based on one of information depending on each second electronic apparatus and a usage condition of each second electronic apparatus,
each second electronic apparatus includes second circuitry configured to
receive the first setting information including the determination information,
compare the group information set for one item of the plurality of items in the first setting information stored in the memory and the group information of the second electronic apparatus,
determine that the first setting information is synchronized with the second setting information for the one item, in response to a determination indicating that the group information set for the one item in the first setting information stored in the memory matches the group information of the second electronic apparatus, and
reflect, in response to a determination indicating that the first setting information is synchronized with the second setting information for the one item of the first setting information, a value set for the one item on the second setting information.

2. The communication system of claim 1, wherein
the second electronic apparatus stores item association information associating the determination information with each of the plurality of items, and
the second circuitry is configured to
compare the determination information set for the one item in the first setting information and the determination information associated with the one item in the item association information, and
determine that the first setting information is synchronized with the second setting information for the one item, in response to another determination indicating that the determination information set for the one item in the first setting information matches the determination information associated with the one item in the item association information.

3. The communication system of claim 1, wherein
the second electronic apparatus stores initial value information set for each of the plurality of items,
the initial value information indicates an initial value preset for each of the plurality of items, and the second circuitry is configured to
compare the initial value set for the one item of the plurality of items in the first setting information and the initial value for the one item of the second electronic apparatus, and
determine that the first setting information is synchronized with the second setting information set for the one item, in response to a determination indicating that the initial value set for the one item in the first setting information matches the initial value set for the one item of the second electronic apparatus.

4. The communication system of claim 1, wherein
the determination information is function information indicating a function included in the second electronic apparatus and is set for each of the plurality of items, and
the second circuitry is configured to
compare the function information set for the one item in the first setting information and the function information set for the one item of the second electronic apparatus, and
determine that the first setting information is synchronized with the second setting information for the one item, in response to a determination indicating that the function information set for the one in the first setting information matches the function information set for the one item of the second electronic apparatus.

5. The communication system of claim 1, wherein the second circuitry is configured to determine that the first setting information is synchronized with the second setting information for the one item of the plurality of items, based on the first setting information when the determination information is not set for the one item.

6. The communication system of claim 1, wherein the second circuitry is configured to determine that the first setting information is not synchronized with the second setting information for the one item of the plurality of items, based on the first setting information when the determination information is not set for the one item.

7. The communication system of claim 1, wherein the first electronic apparatus further includes a memory configured to store the first setting information.

8. A communication method, comprising:
receiving first setting information, by processing circuitry of an electronic apparatus and from another electronic apparatus, the first setting information including determination information that is set for one item of a plurality of items, wherein the determination information being group information used to group the plurality of items in second setting information, the group information being determined based on one of information depending on the electronic apparatus and a usage condition of the electronic apparatus;
comparing, by the processing circuitry, the group information set for one item of the plurality of items in the first setting information and the group information of the electronic apparatus;
determining, by the processing circuitry based on the determination information, that the first setting information is synchronized with the second setting information for the one item in response to a determination indicating that the group information set for the one item in the first setting information matches the group information of the electronic apparatus; and
reflecting, in response to a determination indicating that the first setting information is synchronized with the second setting information for the one item of the first setting information, a value set for the one item on the second setting information.

9. An electronic apparatus, comprising:
a memory configured to store current setting information; and
circuitry configured to
receive, from another electronic apparatus, first setting information including determination information that is set for one item of a plurality of items, wherein the determination information being group information used to group the plurality of items in second setting information, the group information being determined based on one of information depending on the electronic apparatus and a usage condition of the electronic apparatus;
compare the group information set for one item of the plurality of items in the first setting information and the group information of the electronic apparatus;
determine, based on the determination information, that the received setting information is synchronized with the current setting information for the one item in response to a determination indicating that the group information set for the one item in the first setting information matches the group information of the electronic apparatus; and
reflect, in response to a determination indicating that the received setting information is synchronized with the current setting information for the one item of the first setting information, a value set for the item on the second setting information.

10. The communication system of claim 1, wherein the first electronic apparatus is an electronic whiteboard apparatus including a touchpanel.

11. The communication system of claim 10, wherein the one item indicates is a stroke input to the touch panel.

12. The communication system of claim 11, wherein
the first electronic apparatus includes a first display,
the second electronic apparatus includes a second display, and
both the first display and the second display output the stroke input.

13. The communication system of claim 1, wherein the plurality of items includes an IP address.

14. The communication system of claim 1, wherein the plurality of items includes a contact list.

15. The communication system of claim 1, wherein the plurality of items includes a template.

16. The communication system of claim 1, wherein the second electronic apparatus includes a plurality of second electronic apparatuses.

17. The communication system of claim 16, wherein
the determination information includes group information,
the second circuitry uses the group information to group the plurality of items in the second setting information.

18. The method of claim 8, wherein the another electronic apparatus include a plurality of other electronic apparatuses.

* * * * *